(12) United States Patent
Matsubara

(10) Patent No.: US 7,697,091 B2
(45) Date of Patent: Apr. 13, 2010

(54) LIQUID CRYSTAL DISPLAY WITH CONTROLLED VIEWING ANGLE PROPERTIES

(75) Inventor: Ryouta Matsubara, Minami-ashigara (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 938 days.

(21) Appl. No.: 11/487,998

(22) Filed: Jul. 18, 2006

(65) Prior Publication Data

US 2007/0019139 A1    Jan. 25, 2007

(30) Foreign Application Priority Data

Jul. 19, 2005    (JP)    ............................. 2005-208351

(51) Int. Cl.
*G02F 1/1333*    (2006.01)
*G02F 1/1335*    (2006.01)

(52) U.S. Cl. ............................. 349/85; 349/33; 349/117

(58) Field of Classification Search .................... 349/33, 349/85, 117, 118
See application file for complete search history.

(56) References Cited

U.S. PATENT DOCUMENTS 5,774,197 A * 6/1998 Nakamura ................... 349/117
5,883,685 A * 3/1999 Mazaki et al. ............... 349/117

* cited by examiner

*Primary Examiner*—Michael H Caley
(74) *Attorney, Agent, or Firm*—Buchanan Ingersoll & Rooney PC

(57) ABSTRACT

A novel liquid crystal display including a liquid crystal cell including at least liquid crystal, and an optically anisotropic layer capable of optically compensating the liquid crystal cell is disclosed. It is in a first gray scale state where a subtraction of an Re(0) value of the optically anisotropic layer from an Re(0) value of the liquid crystal cell results in a positive value while being applied with a voltage falling within a first range, and in a second grayscale state where a subtraction of an Re(0) value of the optically anisotropic layer from an Re(0) value of the liquid crystal cell results in a negative value while being applied with a voltage falling within a second range.

6 Claims, 6 Drawing Sheets

LIQUID CRYSTAL DISPLAY WITH CONTROLLED VIEWING ANGLE PROPERTIES

This application claims benefit of priority under 35 USC 119 to Japanese Patent Application No. 2005-208351 filed Jul. 19, 2005.

BACKGROUND OF THE INVENTION

1. Field of the Invention

The present invention relates to a liquid crystal display, more particularly, to a liquid crystal display employing a bend alignment made, improved in viewing angle property.

2. Description of the Related Art

A liquid crystal display (LCD) has significant advantages over a CRT (cathode ray tube), i.e., a smaller thickness, a lighter weight, and lower power consumption. A liquid crystal display generally comprises a liquid crystal cell and two polarizers provided on both sides of the liquid crystal cell. The liquid crystal cell generally comprises a rod-like liquid crystalline compound, two substrates for enclosing the compound, and an electrode layer for applying a voltage to the liquid-crystalline compound. An alignment layer is provided on each of the two substrates to align rod-like liquid crystalline molecules.

In order to reduce the coloration caused in images displayed on liquid crystal cells, optical compensation sheets (retardation plates) are often provided between the liquid crystal cells and polarizers. A combination of a polarizer and an optical compensation sheet serves as an elliptic polarizer. An optical compensation sheet is also used for improving the viewing angle of a liquid crystal cell.

Stretched synthetic polymer films (e.g., a polycarbonate film or polysulfone film) have been used as optical compensation sheets.

It has been also proposed to use an optical compensation sheet comprising a transparent support and an optically anisotropic layer formed of a liquid crystalline composition of a discotic compound instead of a synthetic polymer film. The optically anisotropic layer can be formed by aligning molecules of the discotic compound and fixing the alignment of the same. In general, discotic compounds exhibit a great birefringence. Further, discotic compounds have a variety of alignment modes. Therefore, the use of a discotic compound makes it possible to produce an optical compensation sheet exhibiting optical properties which cannot be obtained by a synthetic polymer film according to the related art. Various optical compensation sheets employing a discotic compound have been proposed (see JPA No. hei 6-214116, the term "JPA" as used herein means an "unexamined published Japanese patent application (Kohkai Tokkyo Kouhou)", U.S. Pat. Nos. 5,583,679 and 5,646,703, the publication of West Germany Unexamined Application No. 3911620).

A transparent support, supporting an optically anisotropic layer, is sometimes required to exhibit an optical isotropy (a low retardation value), and in such a case, a cellulose acetate film is usually used as a transparent support. A transparent support, supporting an optically anisotropic layer, is also sometimes required to exhibit an optical anisotropy (a high retardation value), and in such a case, a stretched synthetic polymer film (e.g., a polycarbonate film or polysulfone film) is usually used. In the technical field of optical materials such as optical compensation sheets, it has been a general rule to use a synthetic polymer film where a polymer film having optical anisotropy (a high retardation value) is required and to use a cellulose acetate film where optical isotropy (a low retardation value) is required. Overthrowing the general rule of the related art, a cellulose acetate film, which can be used even in applications where optical anisotropy is required, is disclosed in the publication of European Unexamined Patent Application No. 0911656.

Liquid crystal displays comprising a liquid crystal cell of employing a bend alignment mode, in which rod-like liquid crystalline molecules are aligned substantially in opposite directions (symmetrically) between an upper domain and a lower domain of the liquid crystal cell, are disclosed in the U.S. Pat. Nos. 4,583,825 and 5,410,422. Since the rod-like liquid crystalline molecules are aligned symmetrically between the upper domain and the lower domain of the liquid crystal cell, the bend alignment mode liquid crystal cell is capable of self-compensating optically. Therefore, the liquid crystal mode is also referred to as OCB (Optically Compensatory Bend) liquid crystal mode. A liquid crystal display employing a bend alignment mode is advantageous in that it has a high response speed. The bend alignment mode is characterized in that it provides a wider viewing angle and a higher response speed compared to other liquid crystal modes in the related art (TN mode and STN mode). However, the mode needs further improvement when compared to CRTs. A possible approach to further improvement of bend alignment mode liquid crystal displays is to use optical compensation sheets just as done in ordinary liquid crystal modes. Examples of the optical compensation sheets having an optically anisotropic layer formed of a composition comprising a discotic compound and examples of the bend-alignment mode LCD employing such sheets are disclosed in U.S. Pat. No. 5,805,253, the pamphlet of International Unexamined Patent Application No. 96/37804 (the publication of European Unexamined Patent Application No. 0783128), and U.S. Pat. No. 6,064,457.

SUMMARY OF THE INVENTION

A bend alignment mode liquid crystal display, employing an optical compensation sheet(s) having an optically anisotropic layer formed of a composition comprising a discotic compound, is improved in viewing angle. However, the apparatus, utilizing a liquid crystal display device, such as personal computers and word processors, have been used in various environments for various purposes. For example, when those apparatus are used for presentation at a meeting, it is preferable that the display devices have the widest possible viewing angle characteristic because they are simultaneously viewed by a plurality of persons. When those apparatus are used for inputting and displaying information in public places, e.g., in public carriers such as airplanes and trains, it is preferable that a display screen is not viewed by people other than the user for the security of information or privacy. In such a case, it is sufficient to provide a viewing angle that is viewable only to a user. In consideration to the needs thus described, there is demand for a display apparatus which is controlled in viewing angle properties so as to display images both with a wide viewing angle and a narrow viewing angle for a viewer.

It is an object of the invention to provide a liquid crystal display having a simple configuration and capable of displaying images with multi viewing angles from a wide viewing angle to a narrow viewing angle for a single viewer.

The present inventors conducted various studies, and as a result, they found that an OCB mode could display in two types of grayscale states, in one of grayscale state the subtraction of the Re retardation absolute value of an optically anisotropic layer from an Re retardation value of a liquid crystal cell giving a positive value, and in another grayscale state the subtraction of the Re retardation absolute value of an optically anisotropic layer from an Re retardation value of a liquid crystal cell giving a negative value. On the basis of this finding, the present invention was achieved.

In one aspect, the present invention provides a liquid crystal display comprising a liquid crystal cell comprising at least liquid crystal, and an optically anisotropic layer capable of optically compensating the liquid crystal cell, and being in a first gray scale state where a subtraction of an Re(0) value of the optically anisotropic layer from an Re(0) value of the liquid crystal cell results in a positive value while being applied with a voltage within a first range, and being in a second grayscale state where a subtraction of an Re(0) value of the optically anisotropic layer from an Re(0) value of the liquid crystal cell results in a negative value while being applied with a voltage within a second range.

The liquid crystal cell may employ a bend alignment mode.

The liquid crystal display may further comprise a pair of polarizing films disposed sandwiching the liquid crystal cell, wherein the optically anisotropic layer is disposed between at least either of the pair of polarizing films and the liquid crystal cell.

The liquid crystal display may further comprise a support for the optically anisotropic layer, wherein the liquid crystal cell and the support satisfy together a condition expressed by:

$$2.0 \leq (\Delta n \times d)/Rth \leq 4.0$$

where $\Delta n$ represents the refractive index anisotropy of the liquid crystal in the liquid crystal cell; d (nm) represents the thickness of the liquid crystal cell; and Rth (nm) represents retardation in the thickness direction of the surface of the support at a wavelength of 550 nm.

In one embodiment, the liquid crystal display may be driven with an applied voltage falling within a range from $V_1$ to $V_2$, and it may be in the first gray scale state while being applied with a voltage from $V_1$ to $V_x$ and be in the second state while being applied with a voltage from $V_x$ to $V_2$, provided that $V_1 < V_x < V_2$.

In another embodiment, the liquid crystal display may be driven with an applied voltage falling within a range from $V_1$ to $V_2$, and it may be in the first gray scale state while being applied with a voltage from $V_x$ to $V_2$ and be in the second state while being applied with a voltage from $V_1$ to $V_x$, provided that $V_1 < V_x < V_2$.

In the specification, the term "Re(0)" means an in-plane retardation value which is measured for an incoming light of 550 nm in a normal direction to a sample (i.e. an optical compensation sheet, a liquid crystal layer, or a support such as a polymer film).

In the specification, Re and Rth respectively mean an in-plane retardation and a retardation in a thickness-direction at a wavelength $\lambda$. The Re(0) is measured by using KOBRA-21ADH (manufactured by Oji Scientific Instruments) for an incoming light of the wavelength $\lambda$ nm in a direction normal to a film-surface. The Rth is calculated by using KOBRA-21ADH based on three retardation values; first one of which is the Re(0) obtained above, second one of which is a retardation which is measured for an incoming light of the wavelength nm in a direction rotated by +40° with respect to the normal direction of the film around an in-plane slow axis, which is decided by KOBRA 21ADH, as an a tilt axis (a rotation axis), i.e. Re(+40°), and third one of which is a retardation which is measured for an incoming light of the wavelength $\lambda$ nm in a direction rotated by −40° with respect to the normal direction of the film around an in-plane slow axis as an a inclining axis (a rotation axis), i.e. Re(+40°); a hypothetical mean refractive index and an entered thickness value of the film. The mean refractive indexes of various materials are described in published documents such as "POLYMER HANDBOOK" (JOHN WILEY & SONS, INC) and catalogs. If the values are unknown, the values may be measured with an abbe refractometer or the like. The mean refractive indexes of major optical films are exemplified below:

cellulose acylate (1.48), cyclo-olefin polymer (1.52), polycarbonate (1.59), polymethylmethacrylate (1.49), polystyrene (1.59).

When the hypothetical mean refractive index and a thickness value are put into KOBRA 21ADH, nx, ny and nz are calculated. And Nz, which is equal to (nx−nz)/(nx−ny), is calculated based on the calculated nx, ny and nz.

Figure 1:
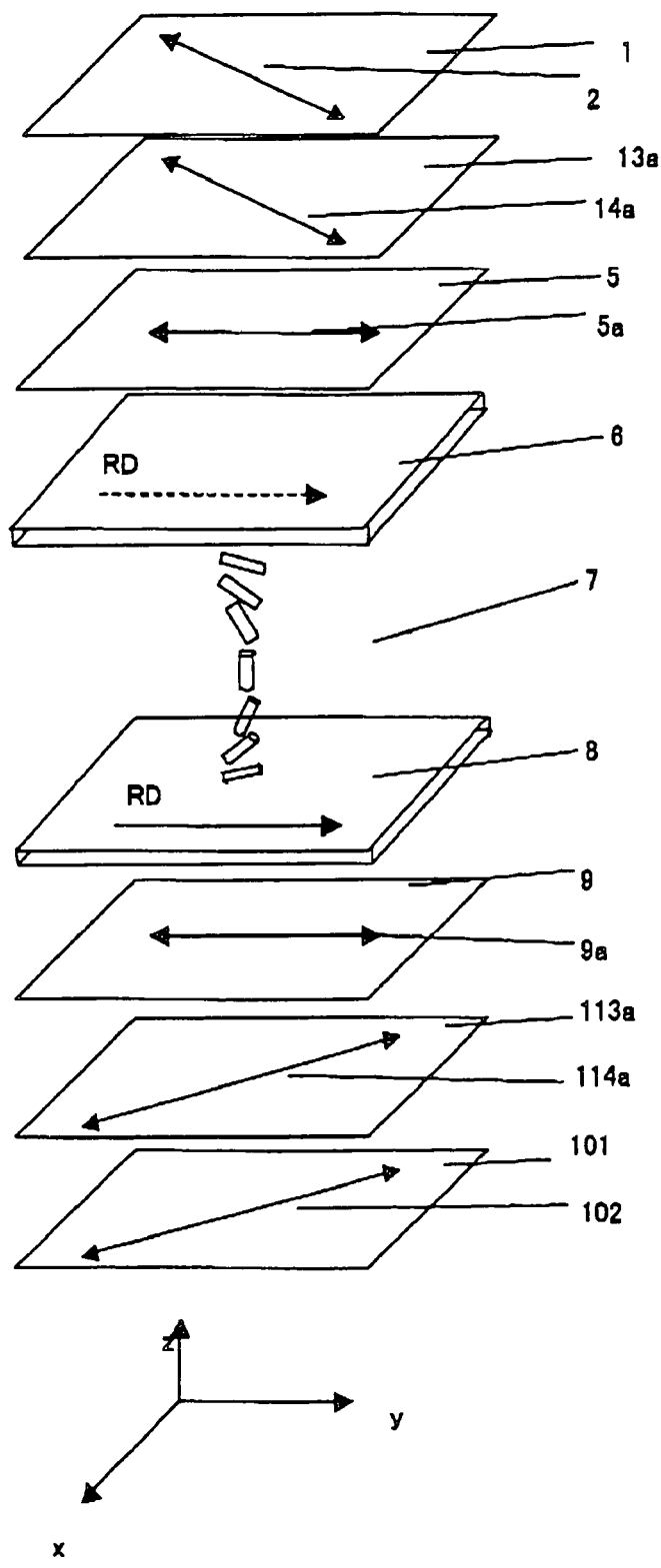
FIG. 1 is a schematic sectional view of an embodiment of a liquid crystal display according to the invention.

Reference numerals used in the drawings express the followings:

1 and 101 polarizing film
2 and 102 transmission axis
13a and 113a support for an optically anisotropic layer
14a and 114a in-plane slow axis
5 and 9 optically anisotropic layer
5a and 9a mean direction of molecular symmetry axes of liquid crystal molecules orthogonally projected to a surface of a substrate
6 and 8 substrate of a liquid crystal cell
7 liquid crystal molecule(s)
33A and 33B support for an optically anisotropic layer
31A and 31B optically anisotropic layer
10 liquid crystal layer

DESCRIPTION OF THE PREFERRED EMBODIMENTS

The invention will now be described in detail. It is to be understood, in this description, that the term " . . . to . . . " is used as meaning a range inclusive of the lower and upper values disposed therebefore and thereafter.

[Liquid Crystal Display]

FIG. 1 is a schematic sectional view of an embodiment of a liquid crystal display according to the invention comprising a liquid crystal cell employing a bend alignment mode.

The OCB mode liquid crystal display shown in FIG. 1 comprises a liquid crystal cell including a liquid crystal layer 7 whose liquid crystal molecules are aligned in a bend alignment state with respect to substrate surfaces when being applied with a voltage, i.e. in a black state; and substrates 6 and 8 sandwiching the same. The surfaces of the substrates 6 and 8 facing the liquid crystal are subjected to an aligning treatment such as a rubbing treatment. In FIG. 1, a rubbing direction is indicated by the arrows RD. The arrow in a broken line indicates the direction as viewed on the other sides of the substrates. Polarizing films 1 and 101 are provided so as to sandwich the liquid crystal cell. The polarizing films 1 and 101 are provided such that respective transmission axes 2 and 102 are orthogonal to each other and are at an angle of 45 degrees to the rubbing direction (not shown) for aligning the liquid crystal layer 7 of the liquid crystal cell. An optical compensation sheet comprising a support 13a or 113a and an optically anisotropic layer 5 or 9 is disposed between the polarizing film 1 or 101 and the liquid crystal cell. The optically anisotropic layers 5 and 9 have optical anisotropy developed by the alignment of molecules of a liquid crystalline compound which is preferably a discotic liquid crystalline compound.

As shown in FIG. 1, the liquid crystal cell comprises a top substrate 6 and a bottom substrate 8 and a liquid crystal layer formed by liquid crystal molecules 7 sandwiched by the substrates 6 and 8. Alignment layers (not shown in FIG. 1) are formed on surfaces of the substrates 6 and a in contact with the liquid crystal molecules 7 (hereinafter also referred to as inner surfaces) to control the liquid crystal molecules 7 such that they are aligned parallel to each other and are tilted by a pre-tilt angle while being applied with no voltage or a low voltage. Transparent electrodes (not shown in FIG. 1) are formed or the inner surfaces of the substrates 6 and 8 to allow a voltage to be applied to the liquid crystal layer constituted by the liquid crystal molecules 7. According to the invention, there is no particular limitation on the product $\Delta n \cdot d$ of the thickness d (micron) of the liquid crystal layer and refractive index anisotropy $\Delta n$. In order to keep both of brightness and viewing angle at a certain level, the product is preferably 100 to 2000 nm, more preferably 150 to 1700 nm, and much more preferably 500 to 1500 nm. Although there is no particular limitation on the liquid crystal material to be used, in a configuration wherein an electric field is applied between the top substrate 6 and the bottom substrate 8, a liquid crystal material having positive dielectric constant anisotropy is used such that the liquid crystal molecules 7 respond in parallel with the direction of the electric field. Generally speaking, in a bend alignment mode liquid crystal cell, liquid crystal molecules in the middle of the cell may be in a twisted alignment.

It is preferable to form a small cell gap in order to achieve a short response time. Specifically, the cell gap is preferably 10 µm or less, more preferably 6 µm or less, and much more preferably 4 µm or less. A preferable way to form a small cell gap is to increase the refractive index anisotropy $\Delta n$ of the liquid crystalline compound. However, when the refractive index anisotropy $\Delta n$ is too high, the refractive index anisotropy may result in excessive wavelength dependence which can affect colors to be displayed. Therefore, the refractive index anisotropy $\Delta n$ is preferably increased within an appropriate range. Specifically, the refractive index anisotropy $\Delta n$ is preferably 0.05 to 0.5 and more preferably 0.1 to 0.3. It is preferable to set a low upper limit (a black state voltage in the normally white mode) for the driving voltage in order to suppress power consumption. From the viewpoint of the cost of a driver IC, it is preferable to allow driving within a voltage range in which a general-purpose driver IC properly works. Specifically, it is preferable to allow driving at a signal level of 15 V or less input to a source wiring, and it is more preferable to allow driving at 10 V or less. The mean tilt angle of liquid crystal molecules at interfaces of the alignment layers is preferably 0° to 20°, more preferably 3° to 15°, and much more preferably 5° to 10° in order to keep both the driving voltage and luminance at a certain level.

Chiral materials which have been generally used in TN mode liquid crystal displays may rarely be used in an OCB mode liquid crystal display because the addition of the materials degrades dynamic response characteristics. However, the materials may sometimes be added to reduce alignment defects. When a multi-domain structure is employed, the material is advantageous in adjusting the alignment of liquid crystal molecules at interfaces between the domains. A multi-domain structure is a structure of a liquid crystal display in which one pixel of the display is divided into a plurality of domains. For example, the use of a multi-domain structure in the OCB mode is preferable in that it improves viewing angle characteristics in terms of brightness and color tones. Specifically, the ununiformities of luminance and color tones dependent on the viewing angle can be reduced through averaging that is achieved by forming each pixel by two or more (preferably four or eight) domains which are different from each other in the initial state of alignment of liquid crystal molecules. The same effect can be achieved by forming each pixel by two or more domains different from each other in which the direction of alignment of liquid crystal molecules continuously changes while being applied with a voltage.

Figure 2:
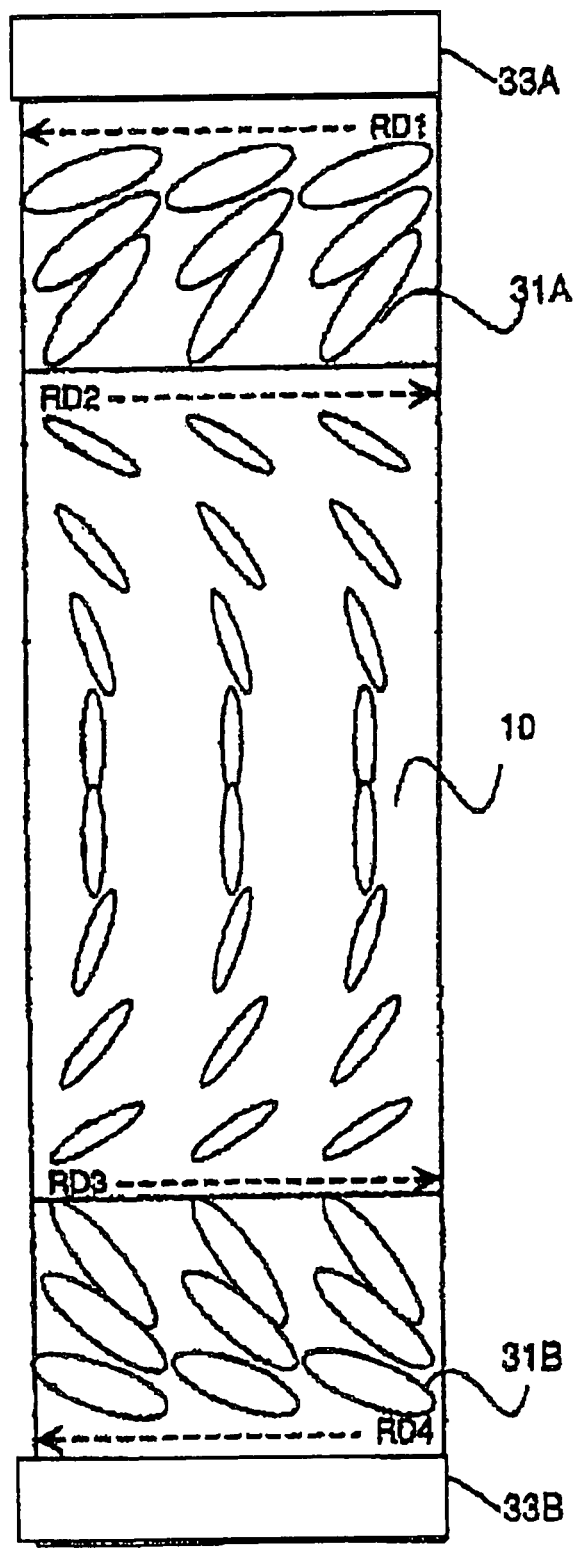
FIG. 2 is a conceptual diagram showing a relationship between optical compensations employed in an OCB mode liquid crystal display.

FIG. 2 is a conceptual diagram showing a relationship between optical compensations provided in the OCB mode liquid crystal display. A bend alignment liquid crystal cell 10 is optically compensated by a combination of optical compensation sheets comprising optically anisotropic layers 31A and 31B formed from a liquid crystal composition containing a discotic compound and transparent supports 33A and 33B having optical anisotropy.

Specifically, the directions (RD1 and RD4) of rubbing for aligning molecules of the discotic molecules constituting the optically anisotropic layers 31A and 31B are set in an anti-parallel relationship with rubbing directions (RD2 and RD3) of the liquid crystal cell. Then, discotic molecules aligned in the optically anisotropic layers 31A and 31B provide an optical compensation of liquid crystal molecules of the bend alignment liquid crystal cell 10 aligned in the vicinity of the interfaces between the cell 10 and the optically anisotropic layers 31A and 31B. The optical anisotropy of the supports 33A and 333 similarly acts on liquid crystal molecules substantially vertically aligned in the middle of the bend alignment liquid crystal cell 10. As thus described, the optical characteristics of the optically anisotropic layers and the supports thereof are set so as to adjust to the alignments of liquid crystal molecules in the liquid crystal cell in a black state, and, thereby, the optical anisotropy of the liquid crystal cell can be optically compensated at a high level to provide a wide viewing angle.

The rubbing direction for the liquid crystal cell 10 is, however not to be limited to, preferably set in the transverse or longitudinal direction of the screen or in the 45° or 135° direction relative thereto.

Referring again to FIG. 1, it is preferable that a slow axis 14a of the support 13a and a slow axis 114a of the support 113a are substantially parallel or orthogonal to each other. When the supports 13a and 113a have slow axes 14a and 114a orthogonal to each other, they cancel birefringence of each other, which makes it possible to prevent any reduction in optical characteristics of light vertically entering the liquid crystal display. In a configuration in which the slow axes 14*a* and 114*a* are parallel to each other, any residual retardation in the liquid crystal layer can be compensated by birefringence of a support.

Transmission axes 2 and 102 of the polarizing films 1 and 101, the directions of the slow axes 14*a* and 114*a* of the supports 13*a* and 113*a*, and the direction of alignment of the liquid crystal molecules 7 are adjusted such that they reside in optimum ranges in accordance with the material used for each of the members, the mode of display, and the structures in which the members are stacked. Specifically the polarizing films 1 and 101 are disposed such that the respective transmission axes 2 and 102 are substantially orthogonal to each other. However, the liquid crystal display according to the invention is not limited to the configuration, and the transmission axes of the polarizing films may be set in any direction relative to longer sides of the panel (display surface).

The optically anisotropic layers 5 and 9 are layers formed from a composition containing a liquid crystalline compound, e.g., a rod-like compound or discotic compound. In the optically anisotropic layers, the molecules of the liquid crystalline compound are fixed in a predetermined alignment state. It is preferable that the mean aligning directions 5*a* and 9*a* of the molecular symmetry axes of liquid crystal molecules in the optically anisotropic layers 5 and 9 at least at the interfaces between the layers and the supports 13*a* and 113*a* intersect the in-plane slow axes 14*a* and 114*a* of the supports 13*a* and 113*a* substantially at 45 degrees. When the optically anisotropic layers 5 and 9 are disposed to satisfy such a relationship, they generate retardation of incident light in a normal direction to the display, which allows light leakage to be suppressed to a higher degree in a black state. It is preferable that the mean aligning directions of the molecular symmetry axes of the optically anisotropic layers 5 and 9 on the side of the interface between the layer and the liquid crystal cell is also substantially at 45 degrees to the in-plane slow axis 14*a* and 114*a* of the supports 13*a* and 113*a*. It is preferable that the mean aligning direction 5*a* of the molecular symmetry axes of fixed liquid crystal molecules in the optically anisotropic layer 5 on the side of the polarizing film (on the side of the interface between the layer and the transparent film) is substantially at about 45 degrees to the transmission axis 2 of the polarizing film 1 that is located closer to the layer. Similarly, it is preferable that the mean aligning direction 9*a* of the molecular symmetry axes of fixed liquid crystal molecules in the optically anisotropic layer 9 on the side of the polarizing film (on the side of the interface between the layer and the transparent film) is substantially at about 45 degrees to the transmission axis 102 of the polarizing film 101 that is located closer to the layer.

When the layers are disposed to satisfy such a relationship, optical switching is enabled according to the sum of retardation generated by the optically anisotropic layer 5 or 9 and retardation generated in the liquid crystal layer, and the effect of the invention can be sufficiently achieved on light entering in an oblique direction.

A principle of image display performed by the liquid crystal display in FIG. 1 will now be described.

Figure 3:
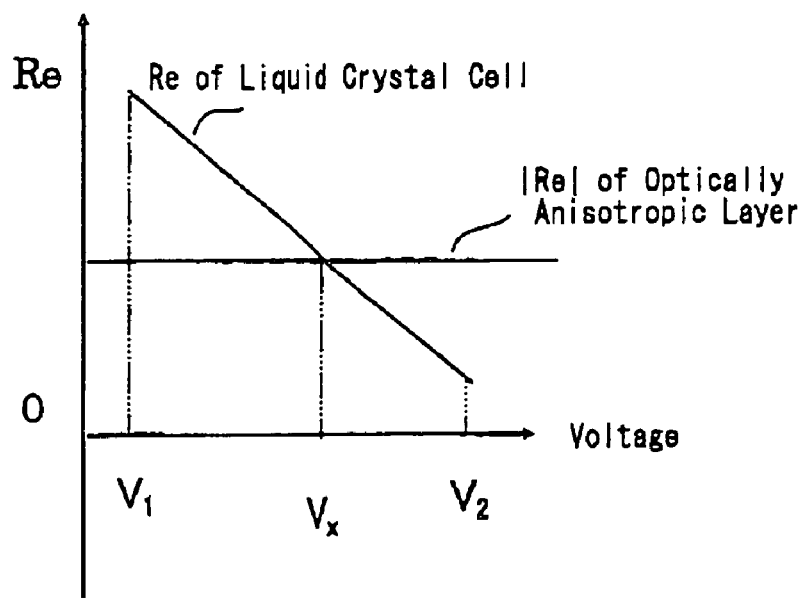
FIG. 3 is a graph schematically showing a relationship between an Re(0) of optically anisotropic layers and an Re(0) of a liquid crystal cell.

The liquid crystal display in FIG. 1 is characterized in that it has two grayscale states when there are applied voltage ranges $V_1$ to $V_2$ ($V_1 \leq V_2$). Specifically, the display is in a first grayscale state in which the subtraction of the Re(0) value of either of the optically an isotropic layers 5 and 9 from the Re(0) value of the liquid crystal cell results in a positive value while being applied with a voltage within a range from $V_1$ to $V_x$ ($V_1 < V_x < V_2$); and is in a second grayscale state in which the subtraction of the Re(0) value of either of the optically anisotropic layers 5 and 9 from the Re(0) value of the liquid crystal cell results in a negative value while being applied with a voltage within a range from $V_x$ to $V_2$. FIG. 3 shows a relationship between the Re(0) value of either of the optically anisotropic layers 5 or 9 and the Re(0) value of the liquid crystal cell. FIG. 3 is a schematic graph shown for the purpose of explanation rather than a graph reflecting actually measured values. As apparent from the graph in FIG. 3, the retardation of either the optically anisotropic layers 5 and 9 stays constant and undergoes no change while being applied with any voltages. The retardation of the liquid crystal cell gradually decreases as the applied voltage increases to cause a change in the bend alignment of the liquid crystal molecules. The retardation of the liquid crystal cell is greater than the retardation of the optically anisotropic layers 5 and 9 at $V_1$ that is the minimum value of the driving voltage. The relationship is reversed when the applied voltage exceeds $V_x$, and the relationship between the retardation values is maintained until $V_2$ that is the maximum value of the driving voltage is reached.

Figure 4:
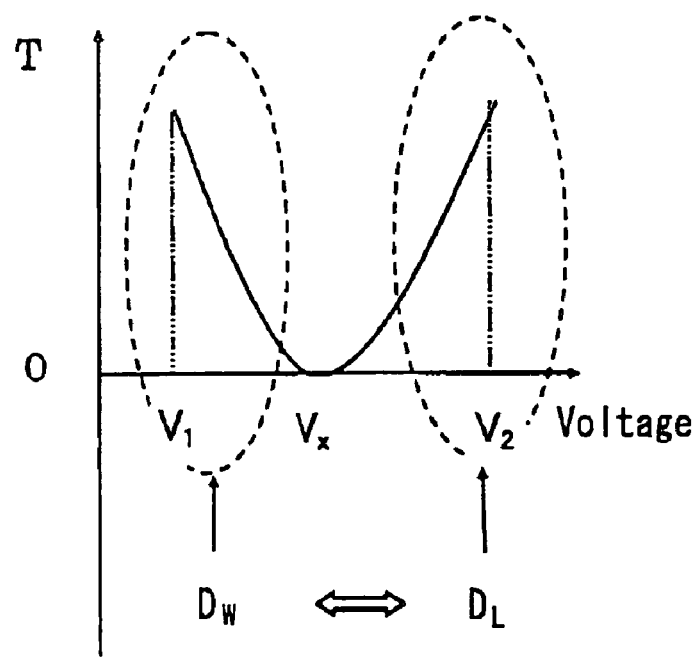
FIG. 4 is a graph showing a relationship between a difference between the Re(0) of the liquid crystal cell and the Re(0) of the optically anisotropic layers and applied voltages.

FIG. 4 shows a relationship between the difference between the Re(0) value of the liquid crystal cell and the Re(0) value of the optically anisotropic layers and the applied voltage. As well as FIG. 3, FIG. 4 is a schematic graph shown for the purpose of explanation rather than a graph reflecting actually measured value. As apparent from the graph in FIG. 4, the difference between the Re(0) value of the crystal cell and the Re(0) value of the optically anisotropic layers is positive while being applied with a voltage falling within a range from $V_1$ to $V_x$ and negative while being applied with a voltage falling within a range from $V_x$ to $V_2$. While applying with a voltage falling within the range from $V_1$ to $V_x$, the wide viewing angle state, $D_w$, is obtainable, and while applying with a voltage falling within a range from $V_x$ to $V_2$, the narrow viewing angle state, $D_n$, is obtainable. As thus described, the liquid crystal cell of this embodiment, being driven with a voltage falling within a range from $V_1$ to $V_2$, the range including the voltage $V_x$ at which the small-high reversal in retardation is occurred, enables to be in both of the wide viewing angle and a narrow viewing angle states and to switch from one state to another state only by an increase or decrease of the applied voltage.

When the in-plane retardation of the optically anisotropic layer is negative, the absolute value of the retardation is used as Re(0). While an example has been described in which the Re(0) value of the liquid crystal cell is smaller than the Re(0) value of the optically anisotropic layers while being applied with a high voltage, the relationship of magnitudes may be reversed. That is, the scope of the invention includes any liquid crystal displays satisfying such a relationship that the subtraction of an Re(0) retardation of optically anisotropic layers from an Re(0) retardation of the liquid crystal cell results in a negative value while being applied with a high voltage and results in a positive value while being applied with a low voltage.

The principle of image display performed by the liquid crystal display according to the invention will now be more specifically described with reference to FIG. 1.

When the minimum driving voltage $V_1$ is applied to transparent electrodes (not shown in the figs) of the top and bottom substrates (not shown in the figs), respectively, of the liquid crystal cell 10, the liquid crystal molecules 7 in the liquid crystal layer are aligned in a predetermined bend alignment state, and the retardation in the liquid crystal cell is not canceled by the in-plane retardation of the optically anisotropic layers 5 and 9. Thus, the state of polarization of incident light changes as the light passes through the liquid crystal cell 6-8.

Since the transmission axes 2 and 102 of the polarizing films 1 and 101 are orthogonal to each other, the polarization axis of light entering the cell from below (for example, from a back electrode) is rotated as the light passes through the liquid crystal cell, and a part or whole of the light consequently passes through the polarizing film 1. That is, a white state is achieved. When the applied voltage is increased to $V_x$, the bend alignment of the liquid crystal molecules 7 in the liquid crystal layer changes, and the in-plane retardation of the liquid crystal cell is thereby reduced and canceled by the in-plane retardation of the optically anisotropic layers 5 and 9. As a result, the state of polarization of incident light undergoes substantially no change, and the light passes through the liquid crystal cell 5-8 with the state of polarization maintained. The light is therefore blocked by the polarizing film 1. That is, a black state is achieved.

The liquid crystal display is in a wide viewing angle state while being applied with a voltage falling within the range from $V_1$ to $V_x$.

When the applied voltage is increased further, the state of bend alignment of the liquid crystal molecules 7 in the liquid crystal cell changes, and the in-plane retardation of the liquid crystal cell is thereby further reduced and is not cancelled by the retardation in the optically anisotropic layers 5 and 9 any more. As a result, when the applied voltage reaches $V_2$, the polarization axis of the incident light is rotated as the light passes through the liquid crystal cell, and a part or whole of the light consequently passes through the polarizing film 1. That is, the white state is achieved again. It should be noted that while being applied with the voltage $V_2$, a high transmittance is achieved only in a range extending clockwise and counterclockwise at small angle such as about 20° to the normal direction of the display screen, i.e., a range of narrow viewing angles. When the viewing angle exceeds the range, black/white reversal occurs so that images become to be unrecognizable.

Therefore, the liquid crystal display is in a narrow viewing angle state while being applied with a voltage falling within the range from $V_x$ to $V_2$.

Further, in the case of the embodiment of a bend alignment rode such as OCB mode, comprising a supports 13a or 113a and an optically anisotropic layer 5 or 9, in which the value $\Delta n \cdot d$ of the liquid crystal cell and the Rth value of the support are in a relationship satisfying Relational Expression 1 shown below, images having high contrast can be obtained in the wide viewing angle state, and images having high contrast can be also obtained in the narrow viewing angle state.

$$2.0 \leq (\Delta n \times d)/Rth \leq 4.0 \qquad \text{Relational Expression 1}$$

In the expression, $\Delta n$ represents the refractive index anisotropy of the liquid crystal in the liquid crystal cell: d represents the thickness (nm) of the liquid crystal cell; and Rth represents retardation (nm) in the thickness direction of each support at a wavelength of 550 nm. More preferably, $(\Delta n \times d)/Rth$ is 2.0 to 3.0.

In general, when two polarizing films are provided in a crossed Nicols relationship, transmittance in the normal direction of the polarizing films is very low, and the transmittance increases when the viewing angle is tilted from the normal direction toward a median line between the transmission axes of the two polarizing films. As described in SID 98 DIGEST p. 315, the increase n transmittance is attributable to the fact that the angle defined by the transmission axes of the polarizing film on the incoming side and the polarizing film on the outgoing side is being shifted from the crossed Nicols relationship (90°) as the viewing angle is tilting against the normal direction. This phenomenon contributes to causing light leakages when a liquid crystal display having two polarizing films provided in a crossed Nicols relationship is viewed in an oblique direction in a black state of the display. The light leakage as a result of tilting of the viewing angle can be significantly reduced by using a combination of a positive a-plate and a positive c-plate, a combination of a negative a-plate and a negative c-plate, or a biaxial film. In the case of the combination of an a-plate and a c-plate, the optical axis of the a-plate is set in parallel with the transmission axis of the polarizing films. In the case of a biaxial film, the slow axis of the film is set in parallel with the transmission axis of the polarizing films. Therefore, the liquid crystal display according to the invention preferably employs optical compensation sheets having optical characteristics provided by the above-described combinations and having the above-described characteristics that allow switching between wide viewing angle state and narrow viewing angle state, since light leakage in an oblique direction can be reduced in the black state of the display, to allow an image having high contrast to be displayed.

[Coloration in a Black State]

In general, it is preferable that wavelength dispersion of each optically anisotropic layer is same as that of the liquid crystal used in the cell since the neutral hue is obtainable and no coloration is observed in the normal direction in black state. When wavelength dispersion of each optically anisotropic layer is different from that of the liquid crystal used in the cell, transmittance varies between R, G, and B pixels, and, as a result, the hue shifts from the neutral hue, and the coloration is observed. The neutral hue of the black state can be obtained by driving the cell according to the condition (1) or (2) described below. Therefore, when the wavelength dispersion of each optically anisotropic layer 9 or 5 is not same as that of the liquid crystal used in the cell, the hue of the black state is preferably made neutral by driving the display such that the condition (1) or (2) is satisfied.

(1) A voltage at each of R, G, and B pixels is adjusted to minimize the transmittance of each of R, G, and B pixels.

(2) A cell gap at each of R, G, and B pixels is adjusted to minimize the transmittance of each of R, G, and B pixels.

In the black state, u0-value (the value of uv chromaticity measured in the normal direction of the liquid crystal display) is preferably 0.17 or more. It is advantageous to adjust the u0-value especially when a wavelength dispersion value $\alpha 1$ of the optically anisotropic layers to be described later is 1.0 to 1.4.

In the black state, it is also preferable that v0-value is 0.18 or more. It is advantageous to adjust the v0-value especially when the wavelength dispersion value $\alpha 1$ of the optically anisotropic layers to be described later is 1.4 to 2.0.

[Wavelength Dispersion Value]

In the liquid crystal display according to the invention, it is desirable that the optically anisotropic layer and transparent support of the optical compensation sheet has a certain wavelength dispersion value.

$\alpha 1$ representing the wavelength dispersion value of an optically anisotropic layer defined by Formula II below is preferably 1.0 to 2.0, more preferably 1.1 to 1.9, and much more preferably 1.2 to 1.8.

$$\alpha = Re(400\ nm)/Re(550\ nm) \qquad \text{(II)}$$

In Formula II, $\alpha$ represents a wavelength dispersion value; Re(400 nm) represents a retardation value measured on light having a wavelength of 400 nm; and Re(550 nm) represents a retardation value measured on light having a wavelength of 550 nm.

α2 representing a wavelength dispersion value of the transparent supports that is defined by Formula II preferably satisfies Formula III shown below, more preferably satisfies Formula III-2 shown below, and much more preferably satisfies Formula III-3 shown below.

$$(1.4-0.5\alpha1<\alpha2<(2.3-0.5\alpha1) \quad \text{(III)}$$

$$(1.5-0.5\alpha1<\alpha2<(2.2-0.5\alpha1) \quad \text{(III)-2}$$

$$(1.6-0.5\alpha1<\alpha2<(2.1-0.5\alpha1) \quad \text{(III)-3}$$

While an embodiment of a liquid crystal display comprising one each upper and lower optical compensation sheets has been described above, only one optical compensation sheet may be provided, and three or more such sheets maybe provided in the liquid crystal display of the invention. However, it is preferable to symmetrically provide such sheets on and under the liquid crystal cell so as to sandwich the same. When two or more optical compensation sheets are provided, the Re(0) retardation of the optically anisotropic layers is the sum of the Re(0) retardation of the optically anisotropic layers of all optical compensation sheets.

A polarizer protection film may be provided between the polarizing film 1 and the support 13a and between the polarizing film 101 and the support 113a. When no protection film is provided, the supports 13a and 113a may serve as protection films for the polarizing films. When polarizer protection films are provided, it is preferable to use films whose Re and Rth retardations are both small so as not to reduce the optical compensatory effect provided by optical compensation sheets. When uniaxial or biaxial films having an Rth retardation of a certain magnitude are used as the protection films, a combined Rth retardation of the protection films and the supports is substituted for Rth in Relational Expression 1. Further, when two or more optical compensation sheets are provided, the sum of Rth retardations of the supports of all optical compensation sheets is substituted for Rth in relational Expression 1.

A liquid crystal display according to the invention is not limited to the configuration in FIG. 1, and it may include various members used in liquid crystal displays according to the related art. For example, there is no particular limitation on the electrode layers formed on the substrates of the liquid crystal cell, and any of amorphous silicon TFTs, high-temperature polysilicon TFTs, and low-temperature polysilicon TFTs for active driving may be used. Driver ICs and memory circuits may be formed on glass substrates to provide an improved aperture ratio and higher definition. In such a case, low-temperature polysilicon TFTs are preferably used. In order to suppress a blur (tailing) of a displayed dynamic picture, it is preferable to perform driving such that a black state is inserted in a white state (as described in AM-LCD '01, p. 63). A display method in which a backlight is blinked (as described in AM-LCD '01, p. 67) is also preferable. The bend alignment liquid crystal cell may be used in the normally white mode (NW mode) or normally black mode (NB mode). Although an embodiment of an OCB mode liquid crystal display has been described, a liquid crystal display according to the invention is not limited to bend alignment modes such as OCB mode, and it is compatible with TN, VA, IPS, HAN, and ECB modes. Semi-transmissive display (as described in AM-LCD '01, p. 55) may be employed to allow the display to be used in either of light and dark room environments.

[Optical Compensation Sheet]

One embodiment of the optical compensation sheet which can be employed in the invention is a multi-layer body comprising an optically anisotropic layer, formed of a composition comprising a crystalline compound, and a support for supporting the optically anisotropic layer. The materials and processes which can be employed for producing this embodiment of the optical compensation sheet will be described in detail.

[Support]

The support included in the optical compensation sheet is preferably transparent and formed of a polymer film. A support exhibiting desired optical anisotropy may be produced by forming a plurality of polymer films one over another. However, it is possible to produce a support satisfying Relational Expression 1 with using one polymer film. Therefore, it is especially preferable that the transparent support is constituted by one polymer film. The optical anisotropy of the transparent support preferably satisfies Relational Expression 1. In general, an Re retardation value of the support measured on light having a wavelength of 632.8 nm is preferably in the range of 10 to 200 nm, and an Rth retardation value of the same measured on light having a wavelength of 632.8 nm is preferably in the range of 50 to 1000 nm. However, the invention is not limited to such values. The retardations are preferably determined based on their relationship with the Δn·d value of the liquid crystal cell such that Relational Expression 1 is satisfied.

An angle of the in-plane slow axis of a stretched polymer film is defined as the angle formed by the slow axis and a reference line (0°) which is defined as a direction in which the polymer film is stretched. When a roll-type film is stretched in the width direction thereof, the width direction is the reference line. When the film is stretched in the longitudinal direction thereof, the longitudinal direction is the reference line. And a direction of the mean angle of the in-plane slow axis is defined as a mean direction of the in-plane slow axis. A mean angle of the in-plane slow axis of the polymer film used as the transparent support is preferably 3° or less, more preferably 2° or less, and much more preferably 1° or less. A standard deviation of the angle of the in-plane slow axes is preferably 1.5° or less, more preferably 0.8° or less, and much more preferably 0.4° or less.

The polymer film is preferably transparent as described above, and the film preferably has a light transmittance of 80% or more. The polymer film preferably has a photoelastic coefficient of $60 \times 10^{-12}$ m²/N or less.

In a transmissive liquid crystal display employing an optical compensation sheet, "frame-like unevenness" may be observed in a peripheral part of the screen when certain time passes after the display is applied with energized. The frame-like unevenness is attributable to an increase in transmittance at the peripheral part of the screen and is significant especially in the black state. A transmissive liquid crystal display, employing a backlight, is heated by the backlight, and has a temperature distribution in the plane of the liquid crystal cell. Variations of optical characteristics (retardation values and the angle of the slow axis) of the optical compensation sheet attributable to the temperature distribution are causes of the "frame-like unevenness" on the screen. The variations in the optical characteristics of the optical compensation sheet are caused by elastic deformation of the optical compensation sheet which is attributable to the fact that expansion or contraction of the optical compensation sheet resulting from a temperature rise is suppressed by its adhesion to the liquid crystal cell or polarizer.

In order to reduce "frame-like unevenness" generated in the transmissive liquid crystal display, a polymer film having a high thermal conductivity is preferably used as the transparent support of the optical compensation sheet. Examples of the polymer having a high thermal conductivity include cellulose type polymers such as cellulose acetate (thermal conductivity: 0.22 W/(m·K)), polyester type polymers such as polycarbonate (0.19 W/(m·K)), and cyclic olefin polymers such as norbornene type polymers (0.20 W/(m·K)).

Commercially available polymers such as norbornene type polymers (e.g, ARTON manufactured by JSR Corporation, ZEONOA manufactured by Zeon Corporation, and ZEONEX manufactured by Zeon Corporation) may be used. Polycarbonate type copolymers are disclosed in JPA Nos. hei 10-176046 and 2001-253960.

It is preferable to use a cellulose type polymer, to use a cellulose ester more preferably, and to use a lower fatty acid ester of cellulose much more preferably. A lower fatty acid is a fatty acid having six or less carbon atoms. The number of carbon atoms is preferably two (cellulose acetate), three (cellulose propionate) or four (cellulose butylate). A mixed fatty acid such as cellulose acetate propionate or cellulose acetate butylate may be used.

Especially, cellulose acetates (cellulose diacetate and cellulose triacetate) are preferable. Cellulose triacetate having an acetic acid content of 59.0 to 61.5% is more preferable. The term "acetic acid content" means the amount of combined acetic acid per unit weight of cellulose. The acetic acid content is determined according to the measurement and calculation of a degree of acetylation described in ASTM: D-817-91 (tests of cellulose acetate).

The viscosity average degree of polymerization (DP) of the polymer is preferably 250 or more and more preferably 290 or more. The polymer has a narrow Molecular weight distribution in terms of Mm/Mn (Mm represents a weight average molecular weight, and Mn represents a number average molecular weight) determined by gel permeation chromatography. Specifically, the value Mm/Mn is preferably 1.00 to 1.70, more preferably 1.30 to 1.65, and much more preferably 1.40 to 1.60.

In order to adjust the retardation of the polymer film, an aromatic compound having at least two aromatic rings may be used as a retardation increasing agent.

When a cellulose acetate film is used as the polymer film, the aromatic compound is used in an amount in the range of 0.01 to 20 parts by weight where the amount of cellulose acetate is 100 parts by weight. The aromatic compound is used preferably in an amount in the range of 0.05 to 15 parts by weight and more preferably in an amount in the range of 0.1 to 10 parts by weight where the amount of cellulose acetate is 100 parts by weight. Two or more types of aromatic compounds may be used in combination.

The aromatic rings of the aromatic compound include an aromatic heterocyclic ring in addition to an aromatic hydrocarbon ring.

The retardation increasing agent preferably has a molecular weight of 300 to 800.

Retardation increasing agents are described in JPA Nos. 2000-111914, 2000-275434 and 2001-166144, and in the pamphlet of International Unexamined Patent Application No. 00/02619.

The polymer film is preferably produced according to a solvent cast method. According to the solvent cast method, a solution (dope) is prepared by dissolving a polymer in an organic solvent, and a film is produced by using the dope. The organic solvent preferably contains a solvent selected from the group consisting of an ether having 2 to 12 carbon atoms, a ketone having 3 to 12 carbon atoms, an ester having 2 to 12 carbon atoms, and a halogenated hydrocarbon having 1 to 6 carbon atoms.

The ether, ketone, and ester may have a cyclic structure. A compound having two or more functional groups of the ether, ketone, and ester (i.e., —O—, —CO—, and —COO—) may also be used as the organic solvent. The organic solvent may have another functional group such as an alcoholic hydroxyl group.

Examples of such ethers include diisopropyl ether, dimethoxymethane, dimethoxyethane, 1,4-dioxane, 1,3-dioxolane, tetrahydrofuran, anisole, and phenetol. Examples of such ketones include acetone, methyl ethyl ketone, diethyl ketone, diisobutyl ketone, cyclohexanone, and methyl cyclohexanone. Examples of such esters include ethyl formate, propyl formate, pentyl formate, methyl acetate, ethyl acetate, and pentyl acetate. Examples of organic solvents having two or more kinds of functional groups include 2-ethoxyl acetate, 2-methoxyethanol, and 2-butoxyethanol. The halogenated hydrocarbon preferably has one or two carbon atoms and much more preferably has one carbon atom. The halogen of the halogenated hydrocarbon is preferably chlorine. The ratio of substitution of hydrogen atoms of the halogenated hydrocarbon with halogen is preferably 25 to 75 mole %, more preferably 30 to 70 mole %, further preferably 35 to 65 mole %, and much more preferably 40 to 60 mole %. Methylene chloride is a representative halogenated hydrocarbon.

A mixture of two or sore kinds of organic solvents may be used.

The polymer solution can be prepared using a common method. The use of a common method means processing at a temperature equal to or higher than 0° C. (at ordinary or high temperatures). The solution may be prepared using a method and apparatus for preparing a dope according to the ordinary solvent cast method. When a common method is used, it is preferable to use a halogenated hydrocarbon (in particular, methylene chloride) as the organic solvent. The amount of the polymer is adjusted such that it will be included in the resultant solution in an amount of 10 to 40 percent by weight. More preferably, the amount of the polymer is 10 to 30 percent by weight. An arbitrary additive, which will be described later, may be added to the organic solvent (main solvent). The solution may be prepared by stirring the polymer and the organic solvent at an ordinary temperature (0 to 40° C.). To obtain a solution of a higher concentration, the stirring may be carried out under a higher pressure and at a higher temperature. Specifically, the polymer and the organic solvent are enclosed in a pressure vessel and then stirred under a high pressure while being heated within a temperature range equal or higher than the boiling point of the solvent at an ordinary temperature and below the temperature at which the solvent will boil. The heating temperature is normally 40° C. or higher, preferably 60 to 200° C., and more preferably 80 to 110° C.

The ingredients may be roughly mixed before putting them in the vessel. Alternatively, the ingredients may be put in the vessel in series. The vessel may be configured to allow the stirring to be performed. The vessel may be pressurized by injecting an inert gas such as nitrogen gas into the same. Alternatively, the pressurization may be carried out utilizing an increase in the vapor pressure of the solvent as a result of heating. The ingredients may alternatively be added under a pressure after the vessel is sealed.

The vessel is preferably heated from outside. For example, a jacket type heating apparatus may be used. Alternatively, a plate heater may be provided outside the vessel, and a tube may be provided to heat the vessel as a whole by circulating a liquid.

The stirring is preferably carried out using a stirring wing provided in the vessel. The stirring wing is preferably long enough to reach the neighborhood of the wall of the vessel. A scratching wing is preferably provided at the end of the stirring wing to new the solution in the form of a film remaining on the wall of the vessel.

The vessel may be provided with a meter such as a manometer or thermometer. The ingredients are dissolved into the solvent in the vessel. The dope thus prepared is taken out of the vessel. Alternatively, the dope may be cooled using a heat exchanger after taking it out.

The polymer solution (dope) may be prepared according to a cooling dissolution method. First, the polymer is gradually added to an organic solvent while stirring them at a temperature near room temperature (−10 to 40° C.). When a plurality of solvents is used, there is no particular limitation on the order in which they are added. For sample, after adding the polymer to a main solvent, the remaining solvents (e.g., a gelatinized solvent of alcohol) may be added. Conversely, the main solvent may be added after wetting the polymer with the gelatinized solvent, which is advantageous in preventing ununiform dissolution. The polymer is preferably prepared such that it will be included in the mixture in an amount of 10 to 40 percent by weight.

The amount of the polymer is more preferably 10 to 30 percent by weight. Further, an arbitrary additive, which will be described later, may be added to the mixture.

The mixture is then cooled to a temperature in the range of −100 to −10° C. (preferably in the range of −80 to −10° C., further preferably in the range of −50 to −20° C., and much more preferably in the range of −50 to −30° C.). For example, the mixture may be cooled in a dry ice/methanol bath (−75° C.) or in a cooled diethylene glycol solution (−30 to −20° C.). The mixture of the polymer and the organic solvent is solidified by cooling it in such a manner. There is no particular limitation on the cooling rate. However, in the case of batch type cooling, since the viscosity of the polymer solution increases as cooling proceeds to reduce the efficiency of cooling, it is required to use a dissolving oven which can efficiently achieve a predetermined cooling temperature.

According to the cooling dissolution method, after the polymer solution is swelled, it may be transported in a short time in the cooling apparatus which has been cooled to a predetermined cooling temperature. Although the cooling rate is preferably as high as possible, there is a theoretical upper limit of 10000° C. per second, a technical upper limit of 1000° C. per second, and a practical upper limit of 100° C. per second. The cooling rate is a value obtained by dividing the difference between the temperature at which the cooling is started and the cooling temperature finally achieved by the time required to reach the final cooling temperature. The mixture is warmed to a temperature in the range of 0 to 200° C. (more preferably in the range of 0 to 150° C., further preferably in the range of 0 to 120° C., and much more preferably in the range of 0 to 50° C.) to obtain a solution in which the polymer is mobile in the organic solvent. The mixture may be warmed by leaving it at room temperature or putting it in a hot bath.

A uniform solution is obtained as described above. When dissolution is insufficient, the cooling and warming operations may be repeated. It can be determined whether dissolution is sufficient or not simply by observing the solution with eyes. When the cooling dissolution method is used, it is desirable to use a sealed vessel to prevent contamination with moisture attributable to dew condensation during cooling. The dissolving time can be shortened by conducting cooling under a high pressure and conducting warming under a low pressure at the cooling and warming operations. It is desirable to use a pressure vessel to conduct the operations at high and low pressures.

When cellulose acetate (acetic acid content: 60.9%, viscosity average degree of polymerization: 299) is dissolved in methyl acetate using the cooling dissolution method to obtain a solution of 20 percent by weight, a pseudo phase transition point between sol and gel states exists at about 33° C. according to differential scanning calorimetry (DSC), and the solution is in a uniform gel state under the temperature. Therefore, the solution must be stored at a temperature equal to or higher than the pseudo phase transition temperature, preferably at a temperature that is about 10° C. higher than the pseudo phase transition temperature. The pseudo phase transition temperature depends on the acetic acid content of the cellulose acetate, the viscosity average degree of polymerization, the concentration of the solution, and the nature of the organic solvent used.

A polymer film is formed from the polymer solution (dope) thus prepared according to a solvent cast method. The retardation increasing agent is preferably added to the dope.

The dope is cast on a drum or band, and the solvent is evaporated to form a film. Prior to the casting, the concentration of the dope is preferably adjusted such that the solid content of the same is in the range of 10 to 40% and, more preferably, in the range of 15 to 35%. The surface of the drum or band is preferably mirror-finished. Methods of casting and drying based on solvent casting are described in the specifications of U.S. Pat. Nos. 2,336,310, 2,367,603, 492,078, 2,492,977, 2,492,978, 2,607,704, 2,739,069, 2,739,070, British Patent Nos. 640731 and 736892, JPB Nos. syo 45-4554 and syo 49-5614 (the term "JPB" as used herein means an "examined published Japanese patent application (Tokkyo Koukoku)"), JPA Nos. syo 60-176834, syo 60-203430 and syo 62-115035. The dope is preferably cast on a drum or band having a surface temperature of 40° C. or lower. After the casting, the dope is preferably dried by being exposed to a flow of air for 2 seconds or more. The film thus obtained is peeled off the drum or band, and the film may be further dried with hot air whose temperature is gradually changed from 100 to 160° C. to evaporate any residual solvent. Such a method is described in JPB No. hei 5-17844. The method makes it possible to shorten the time required for the process from casting up to peeling. In order to implement this method, the dope must be gelatinized by the surface temperature of the drum or band when the dope is cast.

A plurality of polymers may be used.

When a plurality of polymer solutions are cast, the solutions including a polymer may be cast respectively from a plurality of casting holes provided at intervals in the transferring direction of the support to form layers one over another, whereby a film is fabricated (the method is described in JPA Nos. syo 61-158414, hei 1-122419, and hei 11-198285). A film can be also manufactured by casting polymer solutions from two casting holes (see JPB No. syo 60-27562, JPA Nos. syo 61-94724, syo 61-947245, syo 61-104813, syo 61-158413 and hei 6-134933). Further, a polymer film casting method may be employed, in which a flow of a highly viscous polymer solution is enclosed in a polymer solution having a lower viscosity and in which the polymer solutions of high and low viscosities are simultaneously extruded (the method is described in JPA No. syo 56-162617).

A method utilizing two casting holes may alternatively be implemented to fabricate a film, in which a film formed on a support using a first casting hole is peeled off and second casting is conducted on the side of the film which has been in contact with the surface of the support (the method is described in JPB No. syo 44-20235). The plurality of polymer solutions may be identical in their nature. In order to provide a plurality of polymer layers with different functions, polymer solutions may be extruded from the respective casting holes according to the functions.

A polymer solution may be cast simultaneously with liquids applied to provide other functional layers (e.g., an adhesive layer, a dye layer, an anti-static layer, an anti-halation layer, a UV-absorbing layer, and a polarizing layer).

In the case of a single layer of liquid according to the related art, a polymer solution having high concentration and high viscosity must be extruded to achieve a film thickness that is required. In such a case, low stability of the polymer solution has frequently resulted in problems such as granular defects caused by the generation of solid particles and low planarity. As a solution to this, a plurality of polymer solutions may be cast from casting holes to extrude highly viscous solutions on a support simultaneously, which makes it possible to fabricate a high quality planar film having high planarity. Further, the use of a polymer solution of a high concentration allows the load of drying operation to be reduced and allows a film to be produced at a high speed.

A plasticizer may be added to the polymer film to improve the mechanical properties of the same and to improve the drying speed. A phosphoric ester or carboxylic ester is used as the plasticizer. Examples of such phosphoric esters include triphenyl phosphate (TPP) and tricresyl phosphate (TCP). Representative carboxylic esters are phthalic esters and citric esters. Examples of phthalic esters include dimethyl phthalate (DMP), diethyl phthalate (DEP), dibutyl phthalate (DBP), dioctyl phthalate (DOP), diphenyl phthalate (DPP), and diethylhexyl phthalate (DEHP). Examples of citric esters include triethyl o-acetylcitrate (OACTE) and tributyl o-acetylcitrate (OACTB). Examples of other carboxylic esters include butyl oleate, methylacetyl ricinoleate, dibutyl sebacate, and various trimellitic esters. Phthalic ester type plasticizers (DMP, DEP, DBP, DOP, DPP, and DEHP) are preferably used. In particular, DEP and DPP are preferred. The dose of a plasticizer is preferably 0.1 to 25 percent by weight, more preferably 1 to 20 percent by weight, and much more preferably 3 to 15 percent by weight with respect to the weight of the polymer.

A deterioration inhibitor (e.g., an antioxidizing agent, peroxide decomposer, radical inhibitor, metal inactivating agent, oxygen scavenger, or amine) may be added to the polymer film. Deterioration inhibitors are described in JP-A-2-199201, JPA Nos. hei 5-1907073, hei 5-194789, hei 5-271471, and hei 6-107854. The dose of a deterioration inhibitor is preferably 0.01 to 1 percent by weight and more preferably 0.01 to 0.2 percent by weight of the solution (dope) to be prepared. When the dose is less than 0.01 percent by weight, the effect of the deterioration inhibitor is substantially unrecognizable. When the dose is in the excess of 1 percent by weight, the deterioration inhibitor may bleed out on the surface of the film. Butylated hydroxytoluene (BHT) and tribenzylamine (TBA) are particularly preferable deterioration inhibitors.

The polymer film thus produced may further be subjected to a stretching process to adjust the retardation of the same. A preferable stretching rate is in the range of 3 to 100%. After the stretching, the thickness of the polymer film is preferably 20 to 200 μm and more preferably 30 to 100 μm. The standard deviation of the angle of the slow axis of the optical compensation sheet can be reduced by adjusting the stretching conditions. The stretching process may be conducted using a tenter. When a film produced according to a solvent cast method is laterally stretched using a tenter, the standard deviation of the angle of slow axis of the film can be reduced by controlling the condition of the film after stretching the same. Specifically, a stretching process is performed to adjust a retardation value of the film using a tenter. Immediately after the stretching, the polymer film is kept stretched at a rate between the maximum stretching rate and a stretching rate that is one-half of the maximum stretching rate at a temperature near the glass transition temperature of the film, which allows the standard deviation of the angle of slow axis to be reduced. When the film is held at a temperature lower than the glass transition temperature, the standard deviation increases.

When the film is longitudinally stretched between rolls, the standard deviation of the slow axis can be also reduced by increasing the distance between the rolls.

When the polymer film is to serve as a transparent protective film for a polarizing film in addition to the function provided by the film as a transparent support of an optical compensation sheet, a surface treatment is preferably performed on the polymer film. As the surface treatment, a corona discharge treatment, glow discharge treatment, flame treatment, acid treatment, alkali treatment, or ultraviolet irradiation treatment is conducted. An acid treatment or alkali treatment is preferable, and an alkali treatment is more preferable. When the polymer is cellulose acetate, the acid treatment or alkali treatment may be conducted as a saponification treatment on the cellulose acetate.

[Optically Anisotropic Layer]

The optically anisotropic layer is formed from a composition comprising at least a liquid crystalline compound, and the layer exhibits optical anisotropy developed by the alignment of the liquid crystal molecules. When the layer is used for optical compensation of a liquid crystal cell of a bend alignment mode such as OCB mode, the liquid crystalline compound is preferably a discotic compound. In the optically anisotropic layer, as shown in FIG. 2, the molecules of the discotic compound are aligned in an alignment state (hybrid alignment state) in which a tilt angle defined by a discotic surface of a molecule and the surface of a transparent support varies depending on a position of the molecule in the thickness direction from the surface of the support.

The optically anisotropic layer is preferably formed by aligning molecules of the discotic compound on a surface of an alignment layer, and fixing them in an alignment state. It is preferred that molecules of the discotic compound are fixed by polymerization.

There may be no direction in which the retardation value of the optically anisotropic layer is 0. That is, the minimum value of retardation in the optically anisotropic layer may be a value in the excess of 0. A preferable range of retardation in the optically anisotropic layer depends on the mode of the liquid crystal cell to be compensated. Generally speaking, however, an Re retardation value of the optically anisotropic layer measured for light having a wavelength of 632.8 nm is preferably 10 to 300 nm, more preferably 50 to 250 nm, and much more preferably 100 to 200 nm.

The optically anisotropic layer preferably has a Re(632.8 nm) value, a Re(40°) value, and a Re(−40°) value which satisfy Formulae IV and V.

$$0.1 < Re(40°)/Re(632.8 \text{ nm}) < 2.0 \quad \text{(IV)}$$

$$0.1 < Re(-40°)/Re(632.8 \text{ nm}) < 1.0 \quad \text{(V)}$$

In Formulae IV and V, Re(632.8 nm) is an Re retardation value of the optically anisotropic layer measured for a light having a wavelength of 632.8 nm; Re(40°) is an Re retardation value of the optically anisotropic layer measured for a light having a wavelength of 632.8 nm in the direction rotated by 40° relative to the normal direction about a rotation axis constituted by a slow axis of the optically anisotropic layer; and Re(−40°) is an Re retardation value of the optically anisotropic layer measured for light having a wavelength of 632.8 nm in the direction rotated by −40° relative to the normal direction about the rotation axis constituted by the slow axis of the optically anisotropic layer. The positive and negative signs of the rotation angle are determined so that Re(40°)>Re (−40°) is satisfied. It is further preferable that Re(450 nm) and Re(550 nm) retardations satisfy Formulae (IV) and (V), and it is most preferable that all Re retardations having a wavelength of 380 nm to 780 nm satisfy Formulae (IV) and (V).

Examples of discotic liquid-crystalline compounds include benzene derivatives described in "Mol. Cryst.", vol. 71, page 111 (1981), C. Destrade et al; truxane derivatives described in "Mol. Cryst.", vol. 122, page 141 (1985), C. Destrade et al. and "Physics lett. A", vol. 78, page 82 (1990); cyclohexane derivatives described in "Angew. Chem.", vol. 96, page 70 (1984), B. Kohne et al.; and macrocycles based aza-crowns or phenyl acetylenes described in "J. Chem. Commun.", page 1794 (1985), M. Lehn et al. and "J. Am. Chem. Soc.", vol. 116, page 2, 655 (1994), J. Zhang et al. Especially preferred examples of the discotic liquid crystalline compound include those described in JPA No. hei 8-50286. The polymerization of the discotic liquid crystalline compound is described in JPA No. hei 8-27284.

The optically anisotropic layer may be formed by applying a coating fluid, comprising a discotic liquid crystalline compound and, if necessary a polymerization initiator and any additive, to a surface of an alignment layer. The thickness of optically anisotropic layer is preferably from 0.5 to 100 μm, and more preferably from 0.5 to 30 μm.

Next, molecule of the discotic liquid crystalline compound aligned in an alignment state may be fixed so as to maintain the alignment. Fixing is preferably carried out by the polymerization reaction of the polymerizable groups contained in the liquid-crystalline molecules. Examples of the polymerization reaction include thermal polymerization reaction using a thermal polymerization initiator and photo-polymerization reaction using a photo-polymerization initiator. Photo-polymerization reaction is preferred.

Examples of photo-polymerization initiators include alpha-carbonyl compounds (described in U.S. Pat. Nos. 2,367,661 and 2,367,670), acyloin ethers (described in U.S. Pat. No. 2,448,828), alpha-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimers and p-aminophenyl ketone (described in U.S. Pat. No. 3,549,367), acridine and phenazine compounds (described in Japanese Laid-Open Patent Publication (Tokkai) shyo No. 60-105667 and U.S. Pat. No. 4,239,850) and oxadiazole compounds (described in U.S. Pat. No. 4,212,970).

The amount of the photo-polymerization initiators to be used is preferably 0.01 to 20%, more preferably 0.5 to 5% with respect to the weight of solids in the coating fluid.

Irradiation for polymerizing the liquid-crystalline molecules preferably uses UV rays. The irradiation energy is preferably 20 to 5000 $mJ/cm^2$, and more preferably 100 to 800 $mJ/cm^2$. Irradiation may be carried out under heating to accelerate the photo-polymerization reaction.

A protective layer may be formed on the optically anisotropic layer.

[Alignment Layer]

An alignment layer is preferably employed for aligning crystalline molecules to form an optically anisotropic layer, the alignment layer is capable of controlling alignment of discotic liquid crystalline molecules.

The alignment layer that can be employed in the invention may be provided by rubbing a layer formed of an organic compound (preferably a polymer), oblique vapor deposition, the formation of a layer with microgrooves, or the deposition of organic compounds (for example, omega-tricosanoic acid, dioctadecylmethylammonium chloride, and methyl stearate) by the Langmuir-Blodgett (LB) film method. Further, alignment layers imparted with orientation functions by exposure to an electric or magnetic field or irradiation with light are also known.

The alignment layers formed by rubbing polymer layers are particularly desirable. Polyvinyl alcohols are preferably used for preparing alignment layers. The polyvinyl alcohols having hydrophobic groups are especially preferred. The hydrophobic groups thereof have affinities with discotic liquid crystalline molecules, and discotic liquid crystalline molecules may be aligned uniformly on a surface of alignment layers comprising polyvinyl alcohols having hydrophobic groups.

The hydrophobic groups may be bonded to the terminals of main chains or side chains of polyvinyl alcohols. The hydrophobic group is preferably selected from aliphatic groups (preferably alkyl group or alkenyl groups) having six or more carbon atoms and aromatic groups. The hydrophobic groups being bonded to the terminal of main chains of polyvinyl alcohols, linking groups are preferably inserted between the hydrophobic groups and the terminals. Examples of the linking group include —S—, —C(CN)$R^1$—, —$NR^2$—, —CS— and the combinations thereof. In the formula, each $R^1$ and $R^2$ represents a hydrogen atom or and preferably represents a $C_{1-6}$ alkyl group.

The hydrophobic group bonded to the terminals of the side chains of polyvinyl alcohols may be obtained by replacing a part of (non-saponified) acetyl groups (—CO—$CH_3$), remaining in vinyl acetate units of polyvinyl alcohols, with acyl groups (—CO—$R^3$) having seven or more carbon atoms. R3 represents an aliphatic group having six or more carbon atoms and an aromatic group. Commercially available modifies polyvinyl alcohols such as "MP103", "MP203" and "R1130", all of which are produced by Kuraray Co., Ltd. may be used.

The saponification degrees of the (modified) polyvinyl alcohols, which can be used for preparing an alignment layer, are preferably 80% or more. The polymerization degree of the (modified) polyvinyl alcohols, which can be used for preparing an alignment layer, are preferably 200 or more.

The rubbing treatment may be carried out by rubbing the surface of a polymer layer with a paper or a cloth in a direction at several times. Usually, the rubbing treatment may be carried out by rubbing a polymer layer with a cloth in which fibers having a uniform length and line thickness are implanted averagely at several times.

For aligning discotic liquid-crystalline molecules in the optically anisotropic layer, an alignment layer is desirably used. However, according to the present invention, an alignment layer is not an essential element after fixing discotic liquid-crystalline molecules because the molecules fixed in an alignment state once can keep the alignment without an alignment layer. Thus, after an optically anisotropic layer is formed on an alignment layer, only the optically anisotropic layer may be transferred from on the alignment layer to on a support, and in such case, the alignment layer is absent.

When an alignment layer is formed between the support and the optically anisotropic layer, an under coating layer or an adhesive layer may be provided between the alignment layer and the support.

The optical compensation sheet may be bonded to a polarizing film to form a polarizing plate and is employed in a liquid crystal display as a member of a polarizing plate. The transparent support for supporting the optically anisotropic layer can be used as a protective layer for protecting the polarizing film, and such a parallel usage can contribute to reducing the number of the members and the thickness of the liquid crystal display as a whole.

[Polarizing Film]

Example of the polarizing film include iodine-based polarizing films, dye-based (such as dichroic dye) polarizing films and polyene-based polarizing films.

The iodine-based or dye-based polarizing films are usually produced by using polyvinyl alcohol films. The slow axis of the polymer film and the transmittance axis of the polarizing film are preferably parallel to each other. More specifically, the angle between the slow axis and the transmittance axis is preferably 3° or less, more preferably 2' or less, and much more preferably 1° or less.

EXAMPLES

The paragraphs below will further detail the present invention referring to Examples. It is to be understood that materials, reagents, amount and ratio of use, operations and so forth shown in the Examples below may properly be modified without departing from the spirit of the present invention. The present invention is therefore not limited to the specific examples described below.

Example 1

Preparation of Cellulose Acetate Solution

A composition as shown below was introduced into a mixing tank and was stirred to dissolve ingredients thereof, whereby a cellulose acetate solution was prepared.

TABLE 1

| Composition of Cellulose Acetate Solution | |
|---|---|
| cellulose acetate having acetic acid content of 60.9% | 100.0 parts by weight |
| triphenyl phosphate (plasticizer) | 7.0 parts by weight |
| biphenyldiphenyl phosphate (plasticizer) | 4.0 parts by weight |
| dye shown below | 0.0006 parts by weight |
| methylene chloride (first solvent) | 402.0 parts by weight |
| methanol (second solvent) | 60.0 parts by weight |

Dye

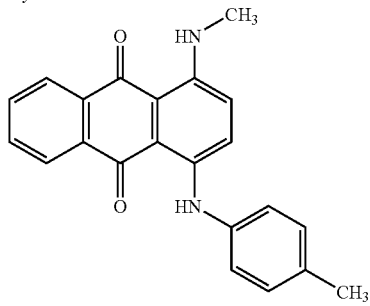

(Preparation of Solution Including Matting Agent Dispersed)

A composition as shown below was introduced into a dispersing machine and stirred to disperse ingredients thereof, whereby a solution including a matting agent dispersed therein was prepared.

TABLE 2

| Composition of Solution Including Matting Agent Dispersed | |
|---|---|
| silica particles of an average diameter of 16 nm (AEROSIL.R972 manufactured by NIPPON AEROSIL CO., LTD) | 2.0 parts by weight |
| methylene chloride (first solvent) | 76.3 parts by weight |
| methanol (second solvent) | 11.4 parts by weight |
| cellulose acetate solution | 10.3 parts by weight |

(Preparation of Retardation Increasing Agent Solution)

A composition as shown below was introduced into a mixing tank and stirred while being warmed to 30° C. to dissolve ingredients thereof, whereby a retardation increasing agent solution was prepared.

TABLE 3

| Composition of Retardation Increasing Agent Solution | |
|---|---|
| retardation increasing agent shown below | 20.0 parts by weight |
| methylene chloride (first solvent) | 58.4 parts by weight |
| methanol (second solvent) | 8.7 parts by weight |
| cellulose acetate solution | 12.8 parts by weight |

Retardation Increasing Agent

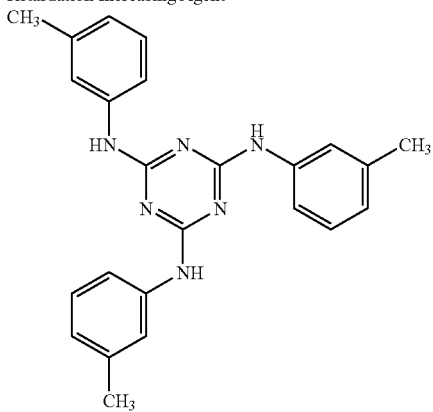

(Preparation of Cellulose Acetate Film)

A cellulose acetate solution of 94.75 parts by weight, a solution of 1.30 parts by weight including matting agent dispersed therein, and a retardation increasing agent solution of 3.95 parts by weight were mixed after filtering each of them, and the mixture was cast using a band casting machine. The weight ratio of the retardation increasing agent to the cellulose acetate was 4.8%. A film including a residual solvent in an amount of 30 percent by weight was peeled off the band. The film was laterally stretched at a stretching rate of 28% using a tenter at 140° C. After the stretching, the film was held at 140° C. for 20 seconds with the stretching rate reduced to 25%. The amount of residual solvent was 14 percent by weight at the point of maximum width. Thereafter, the film was dried for 45 minutes at 130° C. with clips removed from the same, whereby a cellulose acetate film was manufactured. The amount of the solvent remaining in the cellulose acetate film thus manufactured was 0.2 percent by weight, and the film thickness was 88 μm.

(Measurement of Optical Characteristics)

The Re retardation value of the cellulose acetate film thus fabricated against light having a wavelength of 632.8 nm was measured using an ellipsometer (M-150 manufactured by JASCO Corporation). Retardation values Re(40°) and Re(−40°) were measured for lights coming in the direction rotated by 40° and −40° about the in-plane slow axis serving as the rotation axis. An Rth retardation value was determined by calculating a refractive index ny in the direction of a fast axis and a refractive index nz in the thickness direction of the film such that they can fit the measured values of retardations Re(632.8 nm), Re(40°), and Re(−40°) using the film thickness and a refractive index nx in the direction of the slow axis as parameters. Further, an Re retardation value was measured for light having a wavelength of 550 nm. The Re retardation value was 38 nm, and the Rth retardation value was 175 nm.

(Saponification Process on Cellulose Acetate Film)

An isopropyl alcohol solution of 1.5 normal potassium hydride was applied to one surface of the cellulose acetate film thus prepared in an amount of 25 ml/m². The film was left for 5 seconds at 25° C. and thereafter washed for 10 seconds with flowing water. Air at 25° C. was then sprayed to dry the surface of the film. Thus, the surface of only one surface of the cellulose acetate film was saponificated.

(Formation of Alignment Layer)

A coating fluid having the composition shown below was applied to the saponificated surface of the cellulose acetate film (transparent support) in an amount of 24 ml/m² using a #14 wire bar coater. The film was then dried with hot air at 60° C. for 60 seconds and dried further with hot air at 90° C. for 150 seconds. Next, a rubbing process was performed on the film thus formed in a direction at 45° to the stretching direction (which substantially agrees with the slow axis) of the cellulose acetate film (transparent support).

TABLE 4

Composition of Alignment Film Coating Liquid

| | |
|---|---|
| modified polyvinyl alcohol shown below | 20 parts by weight |
| Water | 360 parts by weight |
| Methanol | 120 parts by weight |
| glutaraldehyde (crosslinking agent) | 1.0 parts by weight |

Modified Polyvinyl Alcohol

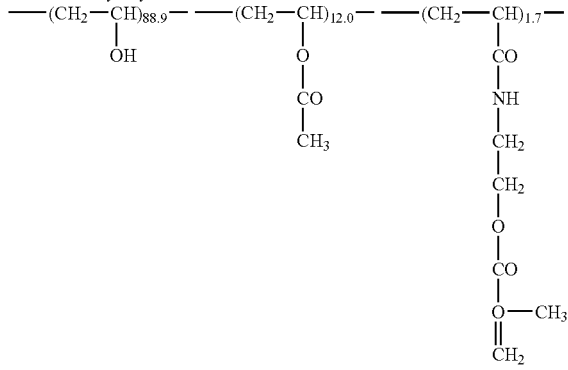

(Formation of Optically Anisotropic Layer)

After the rubbing process, a coating liquid was applied to an surface of the alignment film in an amount of 5.2 ml/m² using a #3 wire bar coater. The coating liquid was obtained by dissolving the discotic compound (2) described below in an amount of 90 parts by weight, trimethylol propane triacrylate modified with ethylene oxide (V#360 manufactured by OSAKA ORGANIC CHEMICAL INDUSTRY LTD.) in an amount of 6 parts by weight, bifunctional acrylate monomer (NK ester A400 manufactured by Shin-Nakamura Chemical Co., Ltd.) in an amount of 4 parts by weight, fluorinated oligomer (FSN100 manufactured by DuPont) in an amount of 0.3 parts by weight, and the optical polymerization initiator described below in an amount of 3 parts by weight in methyl ethyl ketone in an amount of 179.7 parts by weight. The film was then applied to a metal frame and heated in a constant-temperature bath at 130° C. for two minutes to align the discotic compound. Next, the discotic compound was polymerized by irradiating it with ultraviolet light for one minute at 90° C. using a high-pressure mercury lamp of 120 W/cm. Thereafter, the film was left until it was cooled down to room temperature. Thus, an optically anisotropic layer was formed to fabricate an optical compensation sheet.

The optically anisotropic layer was formed similarly to that described above except that the transparent support was changed to a glass substrate. The Re retardation value of the optically anisotropic layer against light having a wavelength of 632.8 nm was measured using the ellipsometer (M-150 manufactured by JASCO Corporation). The Re retardation value was 60 nm. Re(40°) and Re(−40°) retardations were measured for lights coming in the direction rotated by 40° and −40° about the in-plane slow axis serving as the rotation axis.

Further, an Re retardation value (Re(0) value) was measured at a wavelength of 632.8 nm. Re(40)/Re was 2.3, and Re(−40)/Re was 0.2.

(Production of Elliptic Polarizer)

A stretched polyvinyl alcohol film was made to absorb iodine to fabricate a polarizing film.

Next, the transparent support's side of the optical compensation sheet produced as described was applied to one surface of the polarizing film using a polyvinyl alcohol type adhesive. The slow axis of the transparent support and the transmission axis of the polarizing film were made parallel to each other.

A cellulose acetate film available on the market (FUJI-TACK TD80U manufactured by Fuji Photo Film Co., Ltd.) was saponificated in the same manner as saponification of the transparent support, and the film was applied to the opposite surface of the polarizing film (the surface on which the optical compensation sheet was not applied) using a polyvinyl alcohol type adhesive.

An elliptic polarizer was thus produced.

(Production of Bend Alignment Liquid Crystal Cell)

Polyimide films were provided on glass substrates having ITO electrodes as alignment films, and a rubbing process was performed on the alignment films. Eight ITOs were formed in the form of stripes extending in the screen in the longitudinal direction thereof. The rubbing direction was a direction at 90° in the screen. Two glass substrates thus obtained were made to face each other in positions in which the rubbing directions of the substrates were parallel to each other, whereby a cell gap of 4.6 μm was set. The cell gap was filled with a crystalline compound (ZLI1132 manufactured by Merck KGaA) having Δn of 0.1396 to fabricate a bend alignment liquid crystal cell having Δn·d of 640 nm. Therefore, the value Δn·d divided by the retardation Rth of the support was Δn·d/Rth=3.7.

(Production of Liquid Crystal Display)

Two elliptic polarizers produced as described were combined so as to sandwich the bend alignment cell thus produced. The elliptic polarizers were disposed such that their optically anisotropic layers face the cell substrates and such that the rubbing directions of the liquid crystal cell and the rubbing directions of the optically anisotropic layers facing them were in an anti-parallel relationship.

The liquid crystal display thus produced was disposed on a back light. It was confirmed that the display gave a minimum transmittance, i.e. was in a black state, when being applied with a voltage of 2.48 V at which transmittance was minimum. The display had a positive retardation while being applied with a 2.5 V or lower voltage and a negative retardation while being applied with a 2.48V or higher voltage. The display gave a maximum transmittance, i.e. was in a white state, when being applied with a 1.5 V and a 3.39 V. The liquid crystal cell fabricated as described above had an Re(0) retardation of 192 to 120 nm at a voltage of 1.5 V to 2.48 V, and there was a positive difference between the Re(0) value of the cell and the Re(0) value, 120 nm, of the optically anisotropic layers. The cell had an Re(0) value of 120 to 85 nm while being applied with 2.48 V to 3.39 V, and there was a negative difference between the Re(0) value of cell and the Re(0) value of the optically anisotropic layers.

Figure 5:
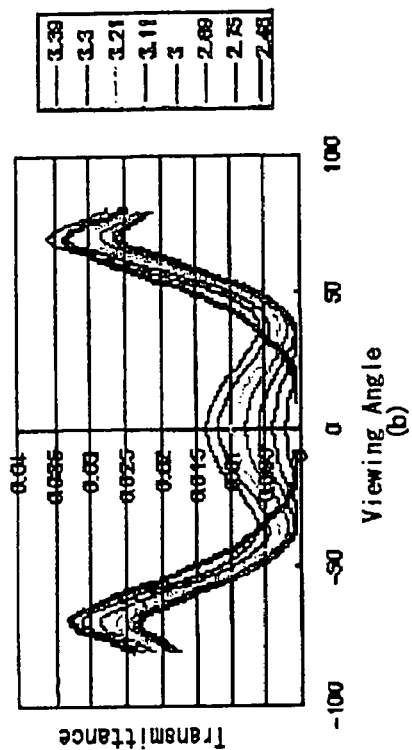
FIGS. 5A and 5B are graphs showing grayscale characteristics observed on a liquid crystal display according to Example 1 at various applied voltages.
Figure 5:
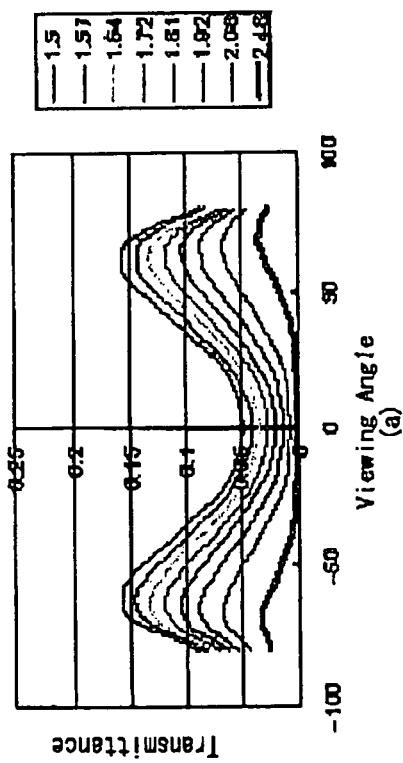

Voltages of 1.5 V, 1.57 V, 1.64 V, 1.72 V, 1.81 V, 1.92 V, 2.08 V, and 2.48 V were applied to the eight stripe ITO electrodes of the liquid crystal cell to provide eight equally stepped transmittances between transmittances in the white and black states, and grayscale characteristics were observed in oblique directions. Next, voltages of 3.39 V, 3.3 V, 3.21 V, 3.11 V, 3.00 V, 2.89 V, 2.75 V, and 2.48 V were applied, and grayscale characteristics were observed in oblique directions. FIG. 5A shows the grayscale characteristics observed when being applied with voltages from 1.5 V to 2.48 V, and FIG. 5B shows the grayscale characteristics observed when being applied with voltages from 3.39 V to 2.48 V. As shown in FIG. 5A, gray level differences between the stripes could be clearly recognized at any oblique directions when being applied with voltages from 1.5 V to 2.48 V. When being applied with voltages from 3.39 V to 2.48 V, gray level differences could be clearly recognized in the 20°-oblique direction relative to the normal direction of the screen plane, grayscale inversion was observed in the oblique direction beyond 20°, and gray level differences were unrecognizable in the oblique direction equal to or greater than 40°. It is understandable that switching between a wide viewing angle state and a narrow viewing angle state can be performed by switching the grayscale state while being applied with a voltage from 1.5 to 2.48 V and the grayscale state while being applied with a voltage from 2.48 to 3.39 V. Although brightness of the white state in the narrow viewing angle state was lower than that in the wide viewing angle state, the preferable brightness could be achieved by increasing the luminance of the backlight.

Example 2

Preparation of Cellulose Acetate Solution

A composition as shown below was introduced into a mixing tank and was stirred to dissolve ingredients thereof, whereby a cellulose acetate solution was prepared.

Table 5

| Composition of Cellulose Acetate Solution | |
| --- | --- |
| cellulose acetate having acetic acid content of 60.9% | 100.0 parts by weight |
| triphenyl phosphate (plasticizer) | 7.0 parts by weight |
| biphenyldiphenyl phosphate (plasticizer) | 4.0 parts by weight |
| dye shown below | 0.0006 parts by weight |

Table 5-continued

| Composition of Cellulose Acetate Solution | |
| --- | --- |
| methylene chloride (first solvent) | 402.0 parts by weight |
| methanol (second solvent) | 60.0 parts by weight |

Dye

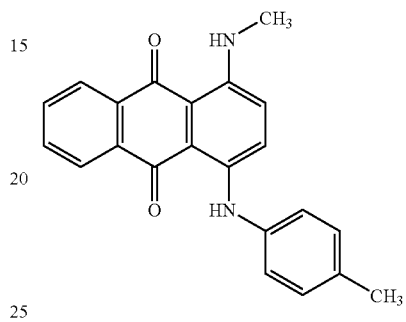

(Preparation of Solution Including Matting Agent Dispersed)

A composition as shown below was introduced into a dispersing machine and stirred to disperse ingredients thereof, whereby a solution including a matting agent dispersed therein was prepared.

TABLE 6

| Composition of Solution Including Matting Agent Dispersed | |
| --- | --- |
| silica particles of an average diameter of 16 nm (AEROSIL.R972 manufactured by NIPPON AEROSIL CO., LTD) | 2.0 parts by weight |
| methylene chloride (first solvent) | 76.3 parts by weight |
| methanol (second solvent) | 11.4 parts by weight |
| cellulose acetate solution | 10.3 parts by weight |

(Preparation of Retardation Increasing Agent Solution)

A composition as shown below was introduced into a mixing tank and stirred while being warmed to 30° C. to dissolve ingredients thereof, whereby a retardation increasing agent solution was prepared.

TABLE 7

| Composition of Retardation Increasing Agent Solution | |
| --- | --- |
| retardation increasing agent shown below | 20.0 parts by weight |
| methylene chloride (first solvent) | 58.4 parts by weight |
| methanol (second solvent) | 8.7 parts by weight |
| cellulose acetate solution | 12.8 parts by weight |

TABLE 7-continued

Composition of Retardation Increasing Agent Solution

Retardation Increasing Agent

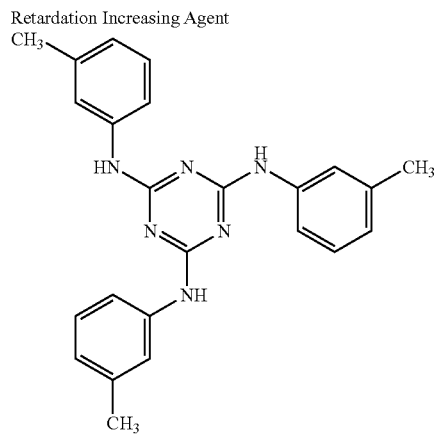

(Preparation of Cellulose Acetate Film)

A cellulose acetate solution of 94.75 parts by weight, a solution of 1.30 parts by weight including matting agent dispersed therein, and a retardation increasing agent solution of 3.95 parts by weight were mixed after filtering each of them, and the mixture was cast using a bard casting machine. The weight ratio of the retardation increasing agent to the cellulose acetate was 4.8%. A film including a residual solvent in an amount of 30 percent by weight was peeled off the band. The film was laterally stretched at a stretching rate of 28% using a tenter at 140° C. After the stretching, the film was held at 140° C. for 20 seconds with the stretching rate reduced to 25%. The amount of residual solvent was 14 percent by weight at the point of maximum width. Thereafter, the film was dried for 45 minutes at 130° C. with clips removed from the same, whereby a cellulose acetate film was manufactured. The amount of the solvent remaining in the cellulose acetate film thus manufactured was 0.2 percent by weight, and the film thickness was 151 μm.

(Measurement of Optical Characteristics)

The Re retardation value of the cellulose acetate film thus fabricated against light having a wavelength of 632.8 nm was measured using an ellipsometer (M-150 manufactured by JASCO Corporation). Retardation values Re(40°) and Re(−40°) were measured for lights coming in the direction rotated by 40° and −40° about the in-plane slow axis serving as the rotation axis. An Rth retardation value was determined by calculating a refractive index ny in the direction of a fast axis and a refractive index nz in the thickness direction of the film such that they can fit the measured values of retardations Re(632.8 nm), Re(40°), and Re(−40%) using the film thickness and a refractive index nx in the direction of the slow axis as parameters. Further, an Re retardation value was measured for light having a wavelength of 550 nm. The Re retardation value was 38 nm, and the Rth retardation value was 300 nm.

After that, the saponification of the film was carried out in the came manner as Example 1. Optical compensation sheets and then elliptic polarizers were prepared in the same manner as Example 1.

(Production of Liquid Crystal Display)

Two elliptic polarizers produced as described were combined so as to sandwich a bend alignment cell produced in the same manner as Example 1. The value Δn·d divided by the retardation Rth of the support was Δn·d/Rth=2.1.

The liquid crystal display thus produced was disposed on a back light. It was confirmed that the display gave a minimum transmittance, i.e. was in a black state, when being applied with a voltage of 2.48 V at which transmittance was minimum. The display had a positive retardation while being applied with a 2.5 V or lower voltage and a negative retardation while being applied with a 2.48V or higher voltage. The display gave a maximum transmittance, i.e. was in a white state, when being applied with a 1.5 V and a 3.39 V. The liquid crystal cell fabricated as described above had an Re(0) retardation of 192 to 120 nm at a voltage of 1.5 V to 2.48 V, and there was a positive difference between the Re(0) value of the cell and the Re(0) value, 120 nm, of the optically anisotropic layers. The call had an Re(0) value of 120 to 51 nm while being applied with 2.48 V to 5.25 V, and there was a negative difference between the Re(0) value of cell and the Re(0) value of the optically anisotropic layers.

Figure 6:
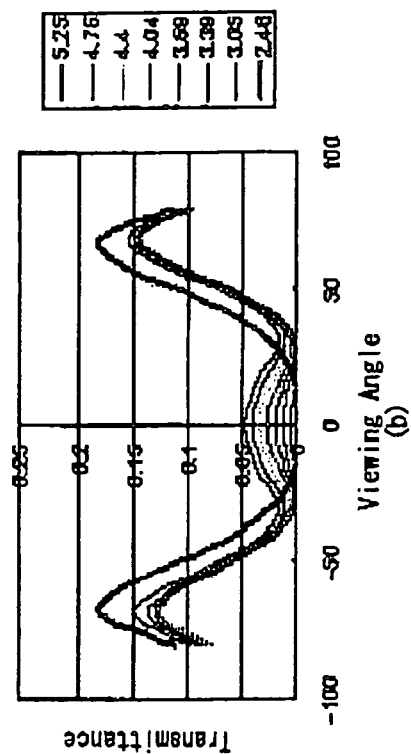
FIGS. 6A and 6B are graphs showing grayscale characteristics observed on a liquid crystal display according to Example 2 at various applied voltages.
Figure 6:
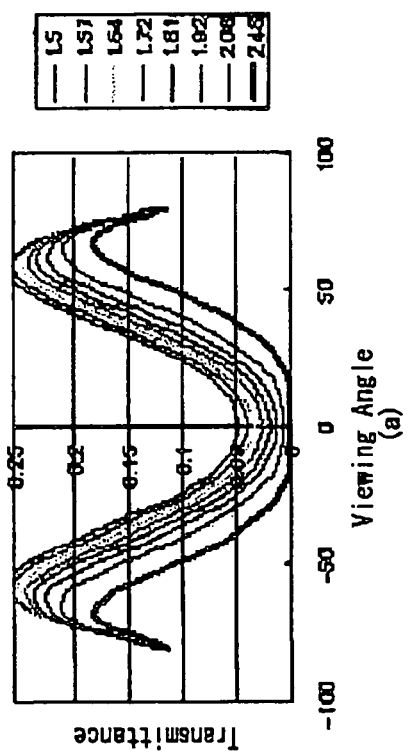

Voltages of 1.5 V, 1.57 V, 1.64 V, 1.72 V, 1.81 V, 1.92 V, 2.08 V, and 2.48 V were applied to the eight stripe ITO electrodes of the liquid crystal cell to provide eight equally stepped transmittances between transmittances in the white and black states, and grayscale characteristics were observed in oblique directions. Next, voltages of 5.25 V, 4.76 V, 4.4 V, 4.04 V, 3.69 V, 3.39 V, 3.05 V, and 2.48 V were applied, and grayscale characteristics were observed in oblique directions. FIG. 6A shows the grayscale characteristics observed when being applied with voltages from 1.5 V to 2.48 V, and FIG. 6B shows the grayscale characteristics observed when being applied with voltages from 5.25 V to 2.48 V. As shown in FIG. 6A, gray level differences between the stripes could be clearly recognized at any oblique directions when being applied with voltages from 1.5 V to 2.48 V. When being applied with voltages from 5.25 V to 2.48 V, gray level differences could be clearly recognized in the 20°-oblique direction relative to the normal direction of the screen plane, grayscale inversion was observed in the oblique direction beyond 20°, and gray level differences were unrecognizable in the oblique direction equal to or greater than 40°. It is understandable that switching between a wide viewing angle state and a narrow viewing angle state can be performed by switching the grayscale state while being applied with a voltage from 1.5 to 2.48 V and the grayscale state while being applied with a voltage from 2.48 to 5.25 V. Although the black fading in the wide viewing angle state was larger than that of Example 1, such a level of the black fading observed in any oblique directions was actually acceptable and didn't substantially contribute to lowering the quality of the LCD.

Example 3

A cellulose acetate film was prepared as a transparent support in the same manner as Example 1 except that the film having a different Rth value was prepared. And optical compensation sheets and then elliptic polarizers were prepared in the same manner as Example 1. Two elliptic polarizers produced as described were combined so as to sandwich a bend alignment cell produced in the same manner as Example 1. The value Δn·d divided by the retardation Rth of the support was Δn·d/Rth=4.0

The liquid crystal display thus produced was disposed on a back light. It was confirmed that the display gave a minimum transmittance, i.e. was in a black state, when being applied with a voltage of 2.48 V at which transmittance was minimum. The display had a positive retardation while being applied with a 2.48 V or lower voltage and a negative retardation while being applied with a 2.48V or higher voltage. The display gave a maximum transmittance, i.e. was in a white state, when being applied with a 1.5 V and a 3.0 V. The liquid crystal cell fabricated as described above had an Re(0) retardation of 192 to 120 nm at a voltage of 1.5 V to 2.48 V, and there was a positive difference between the Re(0) value of the cell and the Re(0) value, 120 nm, of the optically anisotropic layers. The call had an Re(0) value of 120 to 98 nm while being applied with 2.48 V to 3.0 V, and there was a negative difference between the Re(0) value of cell and the Re(0) value of the optically anisotropic layers.

Figure 7:
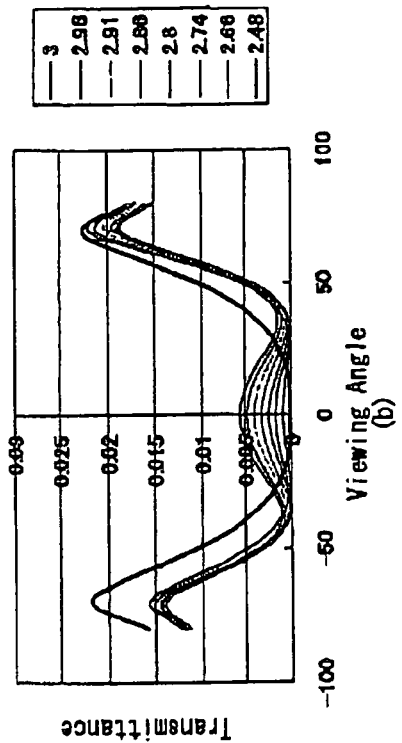
FIGS. 7A and 7B are graphs showing grayscale characteristics observed on a liquid crystal display according to Example 3 at various applied voltages.
Figure 7:
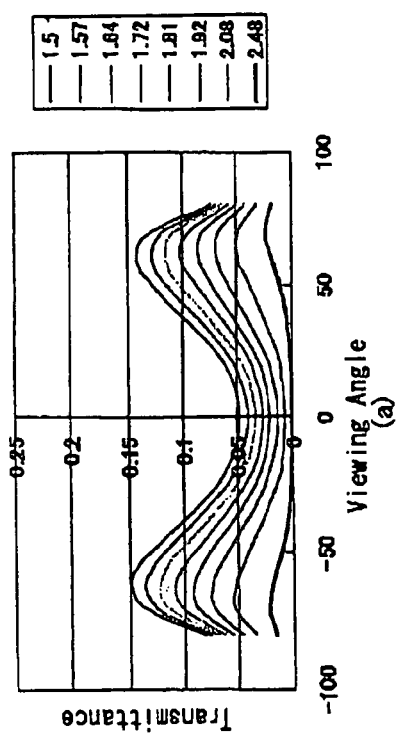

Voltages of 1.5 V, 1.57 V, 1.64 V, 1.72 V, 1.81 V, 1.92 V, 2.08 V, and 2.48 V were applied to the eight stripe ITO electrodes of the liquid crystal cell to provide eight equally stepped transmittances between transmittances in the white and black states, and grayscale characteristics were observed in oblique directions. Next, voltages of 2.48 V, 2.66 V, 2.74 V, 2.8 V, 2.86 V, 2.91 V, 2.96 V, and 3.0 V were applied, and grayscale characteristics were observed in oblique directions. FIG. 7A shows the grayscale characteristics observed when being applied with voltages from 1.5 V to 2.48 V, and FIG. 7B shows the grayscale characteristics observed when being applied with voltages from 2.48 V to 3.0 V. As shown in FIG. 7A, gray level differences between the stripes could be clearly recognized at any oblique directions when being applied with voltages from 1.5 V to 2.48 V. When being applied with voltages from 2.48 V to 3.0 V, gray level differences could be clearly recognized in the 20°-oblique direction relative to the normal direction of the screen plane, grayscale inversion was observed in the oblique direction beyond 20°, and gray level differences were unrecognizable in the oblique direction equal to or greater than 40°. It is understandable that switching between a wide viewing angle state and a narrow viewing angle state can be performed by switching the grayscale state while being applied with a voltage from 1.5 to 2.48 V and the grayscale state while being applied with a voltage from 2.48 to 3.0 V.

INDUSTRIAL APPLICABILITY

A bend alignment mode liquid crystal display, employing an optical compensation sheet(s) having an optically anisotropic layer formed of a composition comprising a discotic compound, is improved in viewing angle by using. However, the apparatus, utilizing a liquid crystal display device, such as personal computers and word processors, have been used in various environments for various purposes. For example, when those apparatus are used for presentation at a meeting, it is preferable that the display devices have the widest possible viewing angle characteristic because they are simultaneously viewed by a plurality of persons. When those apparatus are used for inputting and displaying information in public places, e.g., in public carriers such as airplanes and trains, it is preferable that a display screen is not viewed by people other than the user for the security of information or privacy. In such a case, it is sufficient to provide a viewing angle that is viewable only to a user. In consideration to the needs thus described, there is demand for a display apparatus which is controlled in viewing angle properties so as to display images both with a wide viewing angle and a narrow viewing angle for a viewer.

According to the invention, it is possible to provide a liquid crystal display having a simple configuration and capable of displaying images with multi viewing angles from a wide viewing angle to a narrow viewing angle for a single viewer.

The invention claimed is:

1. A liquid crystal display comprising a liquid crystal cell comprising at least liquid crystal, and an optically anisotropic layer capable of optically compensating the liquid crystal cell, and being in a first gray scale state where a subtraction of an Re(0) value of the optically anisotropic layer from an Re(0) value of the liquid crystal cell results in a positive value while being applied with a voltage falling within a first range, and being in a second gray scale state where a subtraction of an Re(0) value of the optically anisotropic layer from an Re(0) value of the liquid crystal cell results in a negative value while being applied with a voltage falling within a second range, wherein the first gray scale state is a wide viewing angle state and the second gray scale state is a narrow viewing angle state; and the first and the second gray scale states are switchable.

2. The liquid crystal display of claim 1, wherein the liquid crystal cell employs a bend alignment mode.

3. The liquid crystal display of claim 1, further comprising a pair of polarizing films disposed sandwiching the liquid crystal cell, wherein the optically anisotropic layer is disposed between at least either of the pair of polarizing films and the liquid crystal cell.

4. The liquid crystal display of claim 3, further comprising a support for the optically anisotropic layer, wherein the liquid crystal cell and the substrate satisfy together a condition expressed by:

$$2.0 \leq (\Delta n \times d)/Rth \leq 4.0$$

where $\Delta n$ represents the refractive index anisotropy of the liquid crystal in the liquid crystal cell; d (nm) represents the thickness of the liquid crystal cell; and Rth (nm) represents retardation in the thickness direction of the substrate of the support at a wavelength of 550 nm.

5. The liquid crystal display of claim 1, being driven with an applied voltage falling within a range from $V_1$ to $V_2$, being in the first gray scale state while being applied with a voltage from $V_1$ to $V_x$, and being in the second state while being applied with a voltage from $V_x$ to $V_2$, provided that $V_1 < V_x < V_2$.

6. The liquid crystal display of claim 1, being driven with an applied voltage falling within a range from $V_1$ to $V_2$, being in the first gray scale state while being applied with a voltage from $V_x$ to $V_2$ and being in the second state while being applied with a voltage from $V_1$ to $V_x$, provided that $V_1 < V_x < V_2$.

* * * * *